United States Patent [19]
Johnson

[11] Patent Number: 6,137,831
[45] Date of Patent: Oct. 24, 2000

[54] METHOD AND APPARATUS FOR REDUCING RECEIVER IMPOSED DISTORTION

[76] Inventor: Neldon P. Johnson, 512 S. 860 East, American Fork, Utah 84003

[21] Appl. No.: 08/879,755

[22] Filed: Jun. 20, 1997

[51] Int. Cl.[7] .................................................. H03H 7/30
[52] U.S. Cl. ............................ 375/229; 375/285; 375/296
[58] Field of Search ..................... 375/285, 295, 375/296, 229, 259, 230; 455/91, 116, 63; 332/107; 327/306

[56] References Cited

U.S. PATENT DOCUMENTS

| | | | |
|---|---|---|---|
| 3,641,468 | 2/1972 | Hodder | 332/107 |
| 3,805,191 | 4/1974 | Kawai | 332/9 |
| 3,890,620 | 6/1975 | Toman | 343/108 |
| 4,001,728 | 1/1977 | Schneider | 332/1 |
| 4,103,238 | 7/1978 | Deming | 325/141 |
| 4,347,616 | 8/1982 | Murakami | 375/20 |
| 4,387,455 | 6/1983 | Schwartz | 370/11 |
| 4,584,692 | 4/1986 | Yazuka | 375/38 |
| 4,766,589 | 8/1988 | Fisher | 370/98 |
| 5,068,874 | 11/1991 | Leitch | 375/278 |
| 5,220,557 | 6/1993 | Kelley | 455/103 |
| 5,274,672 | 12/1993 | Weiss | 375/305 |
| 5,364,536 | 11/1994 | Tsujimoto | 375/363 |
| 5,369,669 | 11/1994 | Tombal et al. | 370/110.4 |
| 5,390,185 | 2/1995 | Hooijmans et al. | 370/98 |
| 5,517,528 | 5/1996 | Johnson | 375/259 |
| 5,519,735 | 5/1996 | Rice | 375/347 |
| 5,689,529 | 11/1997 | Johnson | 375/259 |

*Primary Examiner*—Don N. Vo
*Attorney, Agent, or Firm*—J. David Nelson

[57] ABSTRACT

Method and apparatus for reducing the distortion imposed upon a combined information wave by a receiver filter or other signal processor. The method includes a step of adjusting the amplitude of the positive and negative segments of the combined information wave such that the positive and negative segments have pre-selected and equal amplitudes. The apparatus includes an adder circuit for combining the component information waves and the reference wave to form the combined information wave, a wave shaper to produce an equalized wave, and a wave multiplier for proportionally adjusting, on a half cycle basis, the amplitudes of the equalized positive and negative segments. The method further includes a step of pre-distorting the combined information wave to compensate for the distortion effect of a receiver filter or other signal processor. The apparatus for pre-distorting the combined information wave comprises a filter or other signal processor which is the same as the receiver filter or signal processor and a wave subtractor for biasing the combined information wave or comprises one or more circuits for mathematically predicting a distortion response to the filter or other signal processor and a wave subtractor for adding the inverse of the distortion response to the wave as it is transmitted.

14 Claims, 22 Drawing Sheets

LEGEND
70- Component Information Wave
71- Reference Circuit
72- Combined Information Wave
73- Equalizer Circuit
74- Negative Combined Information Wave Segment
75- Positive Combined Information Wave Segment
76- Adjusted Combined Information Wave
77- Composite Circuit
78- Continuous Adjusted Combined Wave
79- Transmitter

LEGEND
1- Combined Information Wave
2- Component Information Waves
129- Single Cycle Combined Information Wave
130- Continuous Train of Information Waves LEGEND
3- Single Cycle Component Information Waves
4- Combined Information Waves
5- Allocated Time Slots
6- Highest Frequency Component Information Wave
7- Lowest Frequency Component Information Wave
8- Positive Component Information Wave Segments
9- Negative Component Information Wave Segments

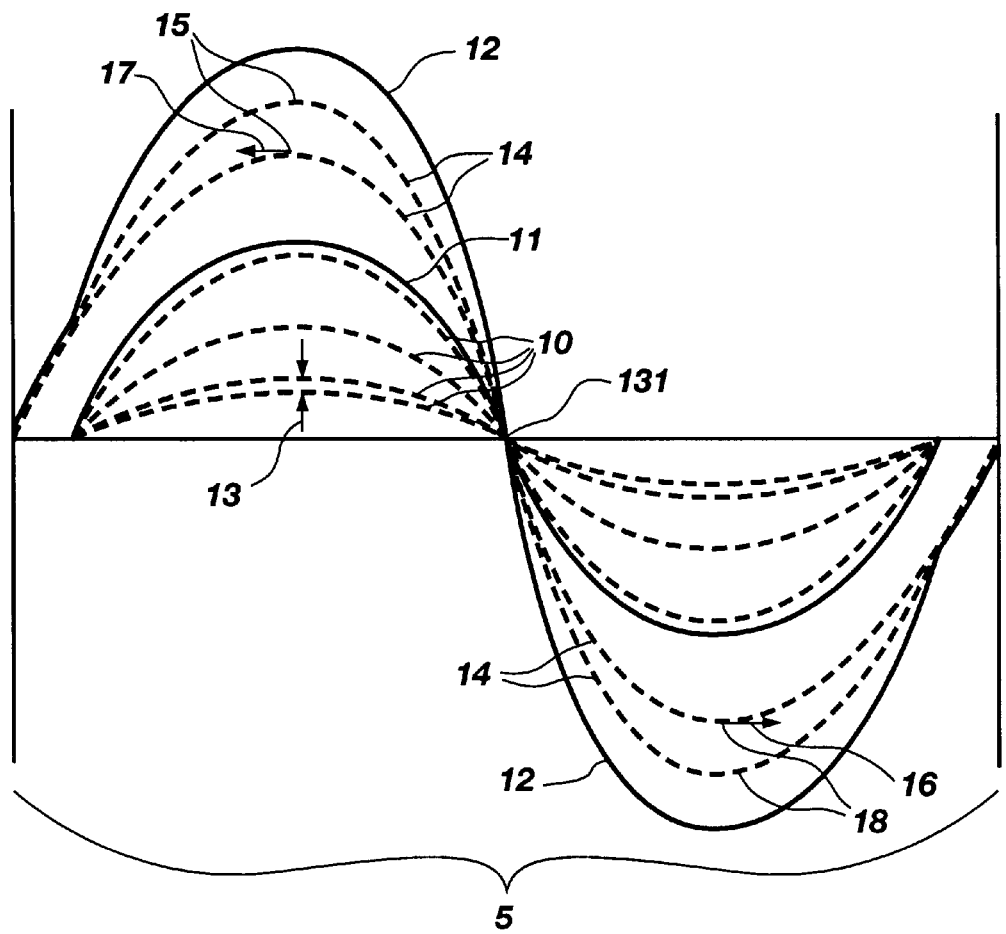

LEGEND
10- Extraction Waves
11- Component Information Wave
12- Combined Information Wave
13- Extraction Wave Amplitude Iteration
14- Residual Wave
15- Apex of Positive Segment of Residual Waves
16- Direction of Initial Progression of Apex of
     Negative Segments of Residual Wave
17- Direction of Initial Progression of Apex of
     Positive Segments of Residual Wave
18- Apex of Negative Segment of Residual Waves
131- Common Zero Amplitude Crossings

*Fig. 3*

LEGEND
19- Combined Information Wave
20- Positive Segments of Component Information Wave
21- Negative Segments of Component Information Wave
22- Discontinuity of Component Information Waves
23- Zero Crossing Point
24- Zero Amplitude Axis
132- Component Information Waves LEGEND
25- Combined Information Wave
26- Zero Crossing of Highest Frequency Component Information Wave
137- Lowest Frequency Component Information Wave
138- Middle Frequency Component Information Wave
139- Highest Frequency Component Information Wave
140- Positive Segments
141- Negative Segments

LEGEND
25- Combined Information Wave
26- Zero Crossing of Highest Frequency Component Information Wave
142- First Resultant Discontinuity
143- First Resultant Wave
144- Second Resultant Wave
148- Extraction Waves
149- Amplitude Interaction

LEGEND
27- Zero Crossing of Second Highest Frequency Component Information Wave
138- Negative Segment of Middle Frequency Component Information Wave
144- Second Resultant Wave
145- Second Resultant Discontinuity
146- Third Resultant Wave
147- Fourth Resultant Wave
148- Extraction Waves
149- Amplitude Interaction

LEGEND
28- Zero Crossing of Lowest Frequency Component Information Wave
147- Fourth Resultant Wave
150- Third Resultant Discontinuity

LEGEND
30- Combined Information Wave
31- Second Component Information Wave
32- First Component Information Wave
33- Zero Amplitude Crossing of Second Component Information Wave
151- Extraction Waves
152- Resultant Wave
153- Resultant Wave Zero Crossing LEGEND
34- First Component Information Wave
35- Second Component Information Wave
36- Zero Amplitude Crossing of Second Component Information Wave
154- Combined Information Wave
155- Extraction Waves
156- Resultant Wave
157- Resultant Wave Zero Crossing LEGEND
70- Component Information Wave
71- Reference Circuit
72- Combined Information Wave
73- Equalizer Circuit
74- Negative Combined Information Wave Segment
75- Positive Combined Information Wave Segment
76- Adjusted Combined Information Wave
77- Composite Circuit
78- Continuous Adjusted Combined Wave
79- Transmitter

LEGEND
80- Reference Waves
81- Component Information Wave
82- Component Information Wave
83- Combined Information Wave
84- Adjusted Combined Information Wave
85- Continuous Adjusted Combined Wave LEGEND
86- Positive Wave Segment Amplitude
87- Negative Wave Segment Amplitude
88- Zero Crossing Point
89- Combined Information Wave

LEGEND
92- Reference Wave
93- Information Wave
94- Combined Wave
95- Adjusted Combined Wave

LEGEND
96- Conventional Step Wave For Storage
97- Information Wave
98- Reference Wave
99- Combined Wave LEGEND
100- Combined Information Wave
103- First Relative Zero Axis
104- Component Information Wave
107- Reference Wave
108- Second Resultant Wave
109- Ninety Degree Phase Point of Reference Wave on Second Resultant Wave
110- Zero Amplitude Axis

Fig. 21

LEGEND
104- Component Information Wave
110- Zero Amplitude Axis
113- Third Relative Zero Axis
136- Ninety Degree Phase Point of the Reference Wave on Fourth Resultant Wave
158- Fourth Resultant Wave

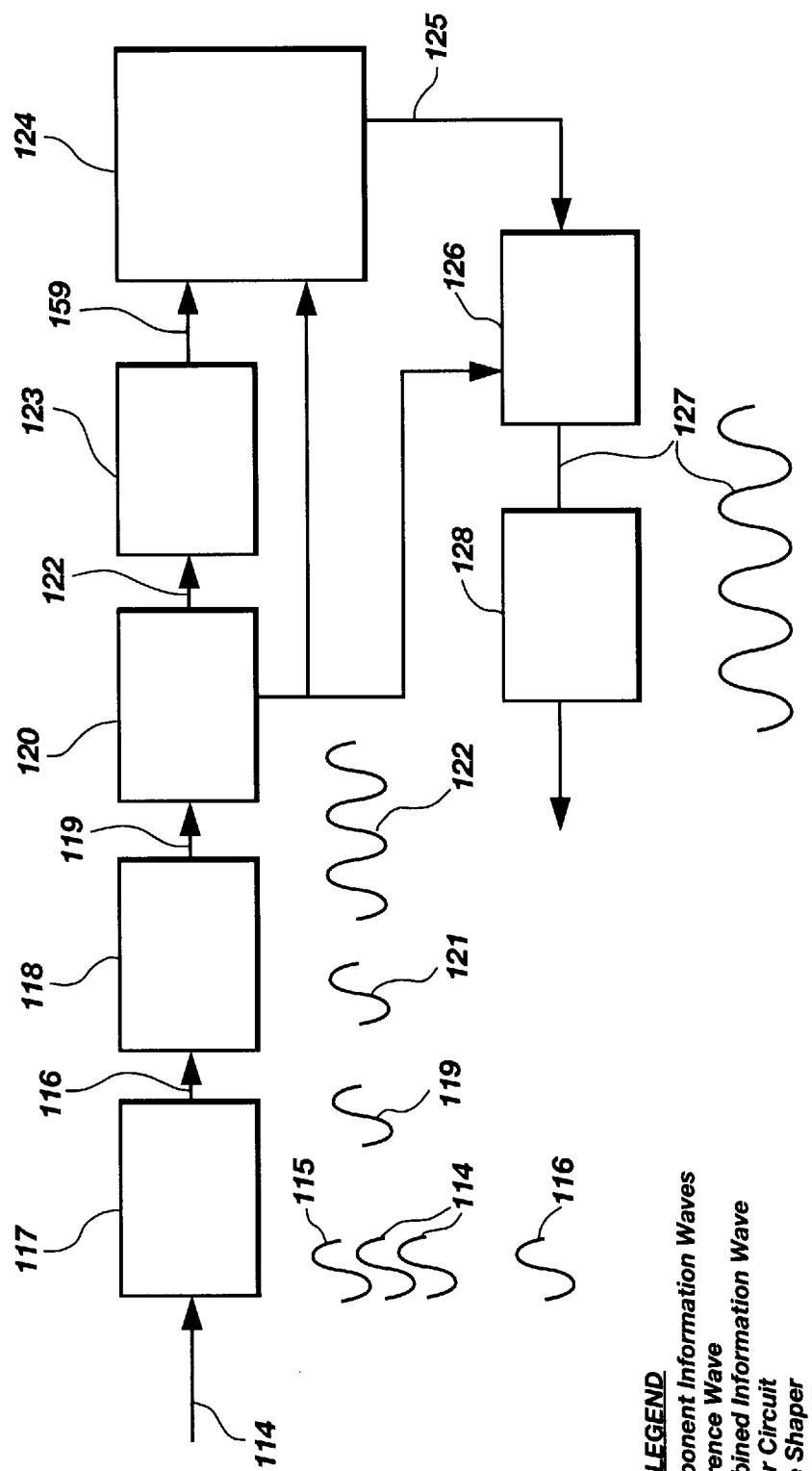

METHOD AND APPARATUS FOR REDUCING RECEIVER IMPOSED DISTORTION

PRIOR RELATED APPLICATIONS

This application is related to a prior filed and currently pending U.S. patent application Ser. No. 08/628,280, filed on Apr. 5, 1996 which is now U.S. Pat. No. 5,689,529, and a prior filed and pending international application, International Application No. PCT/US96/06545, filed on May 13, 1996, designating the United States of America as well as other countries. These two applications are hereinafter referred to as the "prior related applications".

FIELD OF THE INVENTION

This invention is the field of filters for electromagnetic signals and in particular the field of filter systems for separating the components of multiple frequency combined signals.

BACKGROUND OF THE INVENTION

The conventional method for separating out an information signal of a specific frequency from signals of other frequencies, which together with the specific frequency comprise a combined signal, and from noise is a filter comprised of inductor and capacitor circuits. Such filters interfere with and alter the wave and, therefore, fail to reproduce the wave in the pure form in which it was transmitted. The bandwidth of the retrieved wave is substantially larger than the bandwidth of the wave as transmitted. It should be noted, however, that the increase in the bandwidth is not a function of the propagation of the wave. It is a function of the filtering process.

Another problem with conventional filters is that they require multiple cycles of the input signal in order to ramp up. Until the ramping up is complete, the filtering will be ineffective. This substantially limits the amount of data that can be transmitted by multiple frequency signals and extracted by conventional filters. A filtering method is needed which will allow a single cycle to be filtered and data to be accurately extracted from each cycle.

Continuous, time slotted information waves which are simultaneously generated at multiple frequencies, combined and transmitted as a single information signal are disclosed in the prior related applications. Advanced filter systems which allow the utilization of the capabilities of the inventions disclosed in the prior related applications are also disclosed in the prior related applications. However, a filter system is needed which will further minimize the complexity of the signal separation process, will further minimize the bandwidth of the extracted multiple frequency components, and will further enhance the accuracy of the transmitted and extracted data.

The limitations of conventional signal extraction methods also impose substantial limitations on digital information storage technology. Current digital technology allows only one bit per cycle to be transferred from a read/write head to a magnetic storage device such as a hard drive, a magnetic disc, or an external magnetic drive. These current storage systems operate using analog functions. In addition, as data is transferred, the spacing between the storage medium and the read/write head changes, distorting or degrading the signal amplitude. When the distance between the head and the storage medium changes, the energy transfer rate is inversely proportional to the square of the distance. Therefore, any deviation of the read/write head changes the amplitude of the waves. For this reason digital recording procedures can measure only amplitude change. No information is derived from actual amplitudes.

One objective of the present invention is to provide an improved method and apparatus for filtering and separating combined multiple frequency signals.

Another objective of the present invention is to provide for separation of individual frequency components of multiple frequency signals while minimizing interference and minimizing the bandwidth of each of the extracted components, thus further enhancing the accuracy of the data transmitted by each of the extracted wave components.

A still further objection of the present invention is to provide a method and apparatus for separating multiple frequency combined signals while minimizing bandwidth distortion.

A still further objection of the present invention is to provide a method and apparatus for filtering simultaneous multiple frequency signals of distinct frequencies which is simpler, more reliable, and less costly than conventional methods.

A still further objective of the present invention is to provide a filter method and apparatus which will increase the storage capacity of magnetic digital storage devices and will enhance the accuracy of data transfer between a read/write head and a magnetic storage device.

A still further objective of the present invention is to provide an effective filter method and apparatus which is adapted for use with the information transfer receiver apparatuses disclosed in the prior related applications.

A still further objective of the present invention is to provide a filter method and apparatus which will correct for interference and distortion imposed on a multiple frequency combined signal by a conventional filter system.

SUMMARY OF THE INVENTION

The present invention provides a method and apparatus for enhancing filtering and separating of a received multiple frequency combined signal into its various frequency components. It may be used in conjunction with the digital information transfer inventions disclosed in the prior related applications.

Certain preferred embodiments can be utilized where a reference wave is combined with a non-continuous information wave and the zero crossing point of the reference wave coincides with the zero crossing point of the information wave. For these embodiments, the amplitude of the combined information wave is adjusted prior to transmission to a selected amplitude so that all cycles of the combined wave have the same pre-set amplitude. This can be done whether a full cycle of the information wave is used to carry the information or each half cycle segment is used for information. Since the amplitudes of the reference and information waves are adjusted proportionally when the combined wave is adjusted, the amplitude adjustment does not affect the accuracy of the information transmitted.

In the same manner the amplitudes of all of the combined waves in a wave stream, can be adjusted so that they are all the same amplitude. This step allows the waves to be filtered at the receiver through conventional filters or the special filters disclosed in the prior related applications. Because all the waves in a particular wave stream are of the same amplitude they can pass through a conventional filter. Also, because each half cycle is the same amplitude the zero crossing can be found by halving the amplitude. Also, a single cycle of the resultant wave can be stored and can be repeatedly sent through a filter. To the filter this will appear as a continuous wave and will pass through, while noise will be filtered out. The waves can then be separated using amplitude is very useful in certain applications especially those applications where passing the signal through conventional filters is required. This is the case for telephone line communications. It also has utility in wireless communication where communication signals such as the time slotted multiple frequency signals disclosed in the prior related applications can first be separated from other communication signals channels using regular filter techniques. Then the component information waves can be extracted using the methods disclosed for the present invention. This process will provide a cleaner wave For component wave extraction by the methods disclosed.

For preferred embodiments of the present invention, the received combined signal consists of one or more information waves combined with a reference wave. The component information waves are each discontinuous and the phase of each is such as to provide for the zero crossing point of each to match the zero crossing point of the reference wave for each cycle of the reference wave. This produces a point of discontinuity and a thus an interference point in the combined information wave at each of the points of discontinuity of the respective component waves. The combined wave is then multiplied on a half cycle basis so that each half cycle is set to a predetermined amplitude. The amplitude of the positive segment of the combined wave is then equal to the negative segment for each cycle of the reference wave. Each cycle of the combined wave is adjusted in the same way and connected together to form a train of waves, each of the waves having its positive and negative segments adjusted to the same amplitude. The wave is then passed before transmission through a conventional filter or filter system identical to any filter or filter system that is to be used at the receiver. From this step the filter response can be determined and the inverse of the filter interference added to each of the amplitude adjusted combined waves in the train of waves before they are transmitted. Alternatively the interference effect of any receiver filter or filter system on each cycle of the combined wave is mathematically predicted and the inverse of the effect is added to the amplitude adjusted combined wave prior to transmission. The interference that would otherwise be imposed on the wave by the filter, including particularly the interference that would be experienced at the points of discontinuity in the combined wave corresponding to the points of discontinuity of each of the component information waves, is thus neutralized by these corrections made at the transmitter. This allows each of the amplitude adjusted combined waves in the wave train to pass through the conventional filter or filter system with the inherent interference of the filter neutralized.

By making an amplitude adjustment and making a filter bias correction all of the combined waves in the wave train the combined waves will not interfere with other devices. The waves will also pass through conventional pass band filters as long as the pass band is wider than the combined wave frequencies.

Once the wave has passed through the receiver's conventional filter or filter system, it can be demodulated and each component wave extracted on a full cycle or half cycle basis.

A benefit to this type of modulation and these embodiments of the present invention is that whatever affects the combined wave affects the component information waves and reference wave proportionally. Therefore the effects 0f noise and interference are minimized.

BRIEF DESCRIPTION OF THE DRAWINGS

FIG. 3 Extraction waves for component extraction.

FIG. 21 Positive cycle of combined information wave with further steps of component wave extraction.

FIG. 22 Schematic of apparatus of the present invention for pre-distorting component information waves to counteract receiver filter bias.

DETAILED DESCRIPTION OF PREFERRED EMBODIMENTS

Figure 1:
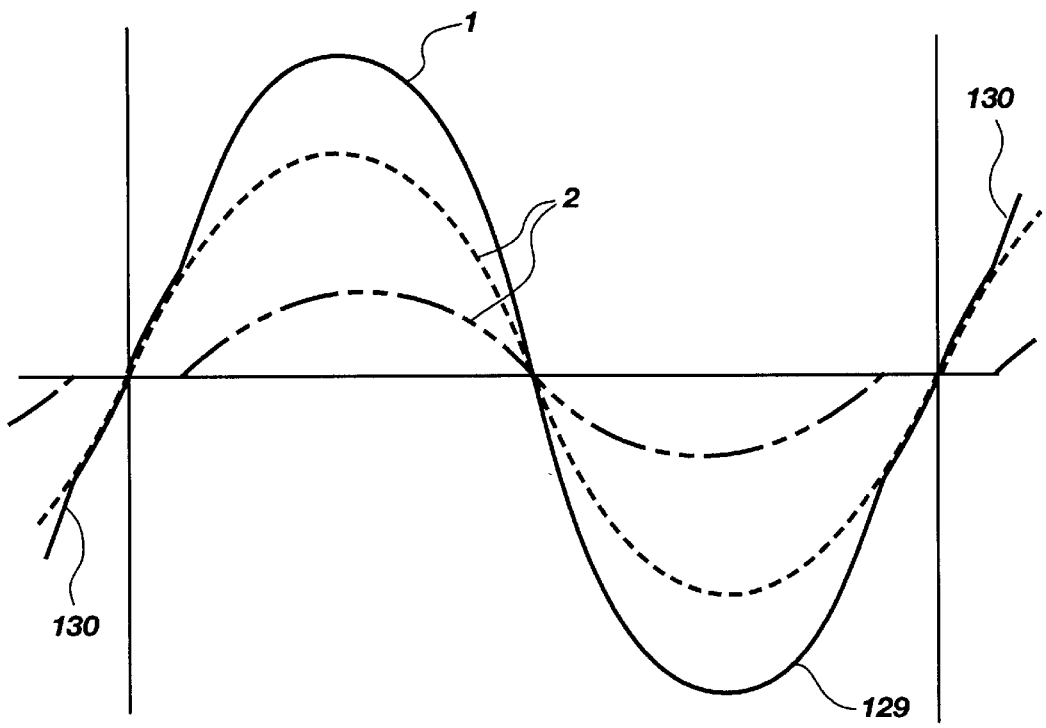
FIG. 1 Combined information wave comprised of two component information waves.

Referring first to FIG. 1, preferred embodiments of the present invention provide for a received combined information wave 1, which is a composite of two or more component information waves 2 of known and distinct frequencies and known wave forms, to be separated into its component information waves. Each component information wave can then be demodulated and the carried information extracted. FIG. 1 illustrates a single cycle combined information wave 129 and a continuous train of information waves 130. Most preferred embodiments utilize a continuous train of waves.

Figure 2:
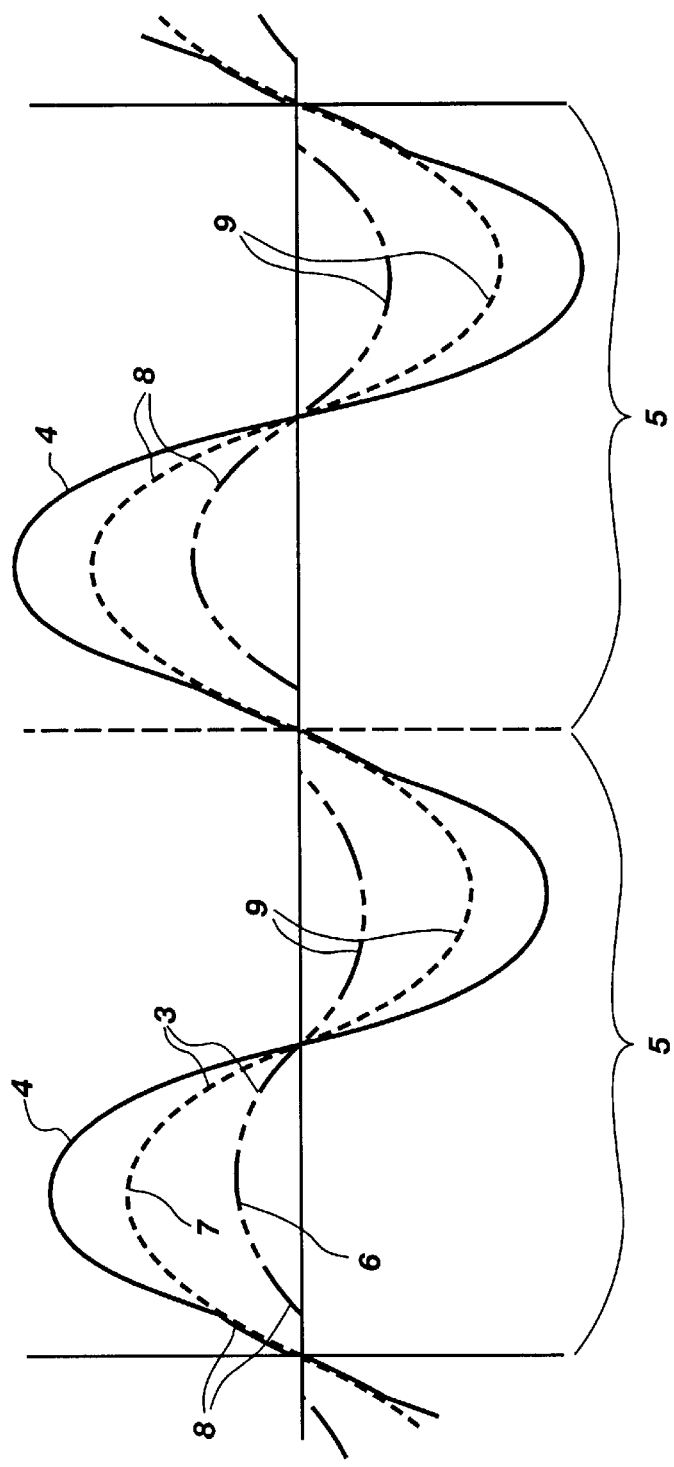
FIG. 2 Time slotted combined information waves comprised of two component information waves.

Referring to FIG. 2, preferred embodiments of the present invention are well suited for utilization with time slotted, combined information waves as disclosed in the prior related applications. The combined information waves 4 generated for the inventions disclosed in the prior related applications are comprised typically of single cycle component information waves 3 of distinct frequencies and wave forms which are received in specific allocated time slots 5. Under preferred embodiments, the component information waves may all commence at the beginning of the time slot, may all end at the end of the time slot, or may all be centered in the time slot as shown in FIG. 2. However, the present invention may be utilized with component information waves which are distributed in the time slot in any selected manner. Similarly the waves may simply be keyed to a reference wave cycle and may be positioned with respect to the reference wave in any selected manner. The component information waves for the embodiment shown in FIG. 1 and 2 are sinusoidal waves. However, the present invention can be utilized with component information waves of any selected wave form.

Under certain embodiments of the present invention, extraction of the component information waves from a combined information wave received in an allocated time slot begins with the highest frequency component information wave 6 and continues with progressively lower frequency waves or begins with the lowest frequency component information wave 7 and continues with progressively higher frequency waves. The positive 8 and the negative 9 segments of the each component information wave are extracted separately, unless a symmetrical wave form is utilized. If each half cycle of each component information wave is used to carry independent information, then each half cycle must be extracted. If the wave is symmetrical, i.e. only one information signal is carried per cycle, then the positive and negative cycles may still be extracted separately in order to verify or average the extracted information.

Referring to FIG. 3, for some preferred embodiments of the present invention, the extraction process begins with extraction waves 10 of progressively larger amplitude having the known frequency and wave form of the selected component information wave 11 being subtracted from the combined information wave 12. Amplitude iterations 13 of the extraction waves are kept as small as needed to achieve the desired accuracy of matching with the component information wave. The residual wave 14 is monitored as extraction waves of progressively larger amplitude are subtracted from the combined information wave. If the waves are all centered in the time slot as shown in FIG. 1 and FIG. 2 so that the zero amplitude crossings 131 match up, and extraction is commenced with the highest frequency component information wave, the apex of the positive segment 15 of the residual wave form 14 will initially progress 17 opposite the direction of propagation 16 of the combined information wave and the apex of the negative segment 18 will initially progress in the direction of propagation 16 of the combined information wave. If extraction is commenced with the lowest frequency information wave, the initial direction of progression of the resultants will be the opposite of that shown in FIG. 3. In any event, depending upon the order of extraction and the location of the waves in the time slot 5, the progression of the resultant can be predicted and utilized to key the extraction of the component waves. When the direction of progression 17 of the positive apex 15 and the negative apex 18 of the residual wave reverses, the amplitude of the extraction wave is the amplitude of the component information wave being extracted and this component information wave can be extracted and subtracted from the combined information wave. If the component information waves are not symmetrical and both the positive and negative segments are utilized to transmit information or either of the segments is transmitted with a known value as a reference, then the process must be repeated independently for both the positive and negative segments of each component information wave.

The process is then repeated for the frequency and wave form of each component information wave until each component information wave has been extracted and subtracted from the combined information wave. Each of the component information waves can then be demodulated and the information carried by these simultaneous, multiple frequency signals can be extracted.

For embodiments of the present invention used in conjunction with the inventions disclosed in the prior related applications, the process is repeated for combined information waves in successive time slots. In this way, multiple channels of time slotted combined information waves can each be successfully and accurately separated into its component information waves for demodulation.

The speed at which the extraction process can be accomplished for the combined information wave received in each time slot will be dependent on the embodiment of hardware and software utilized. The extraction process requires the storage of each combined information wave until extraction is completed.

Figure 4:
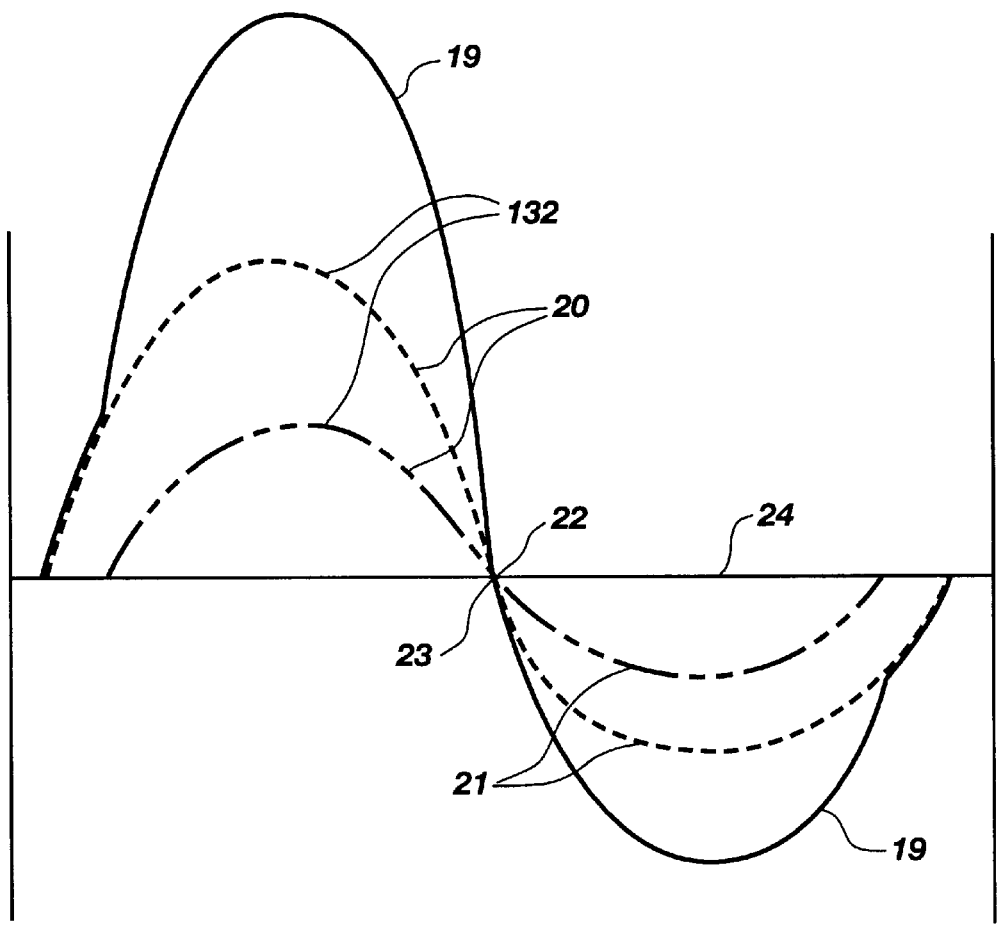
FIG. 4 Combined information wave comprised of two component information waves with common mid cycle zero crossing point.

Referring now to FIG. 4, this figure illustrates how other preferred embodiments of the present invention are adapted for combined information waves 19 which are comprised of component information waves 132 which are not symmetrical and for which one or more of either the positive segments 20 or the negative segments 21 of the component information waves are used as a reference and have a known amplitude and wave form. The other segments, which are used for information transfer, have a known wave form with the amplitude determined as a function of the information carried. Such methods of information transfer are disclosed in the prior related applications. For preferred embodiments of those inventions, the positive segments 20 and negative segments 21 of each wave are of the same frequency and wave form, and only the amplitudes are different. However, the wave forms of the reference segments and the information segments do not necessarily have to be the same.

Because the reference segment and the information segment have a different amplitude, there is a discontinuity 22 and thus an abrupt slope change for each component information wave at its zero crossing point 23 where the component information wave crosses the zero amplitude axis 24. Embodiments of the present invention can use these zero amplitude points of discontinuity as reference points, since these slope change points in the component information waves also produce points of discontinuity in the combined information waves.

Figure 5:
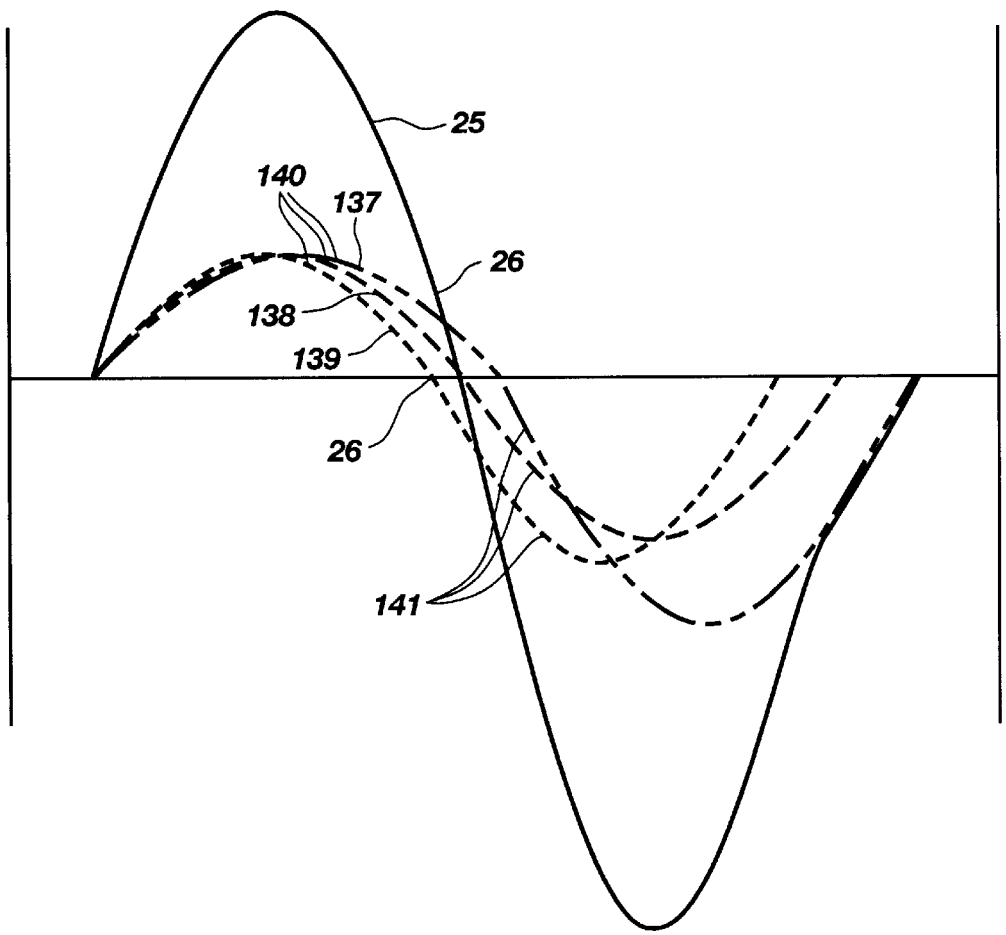
FIG. 5 Combined information wave comprised of three component information waves with common cycle starting point.

FIGS. 5 through 8 illustrate how these points of discontinuity are used for embodiments of the present invention which are utilized for received waves which do not have zero crossing points which coincide, i.e. the component waves are not all centered in the time or wave cycle slot. For these embodiments, the extraction process preferably begins with the highest frequency or the lowest frequency component information wave, but any selected order can be used. The combined wave 25 shown in FIG. 5 is comprised of three component information waves 137, 138, 139. However, as with other embodiments, the number of component information waves that can be combined depends primarily on the total bandwidth available for the combined signal.

Figure 6:
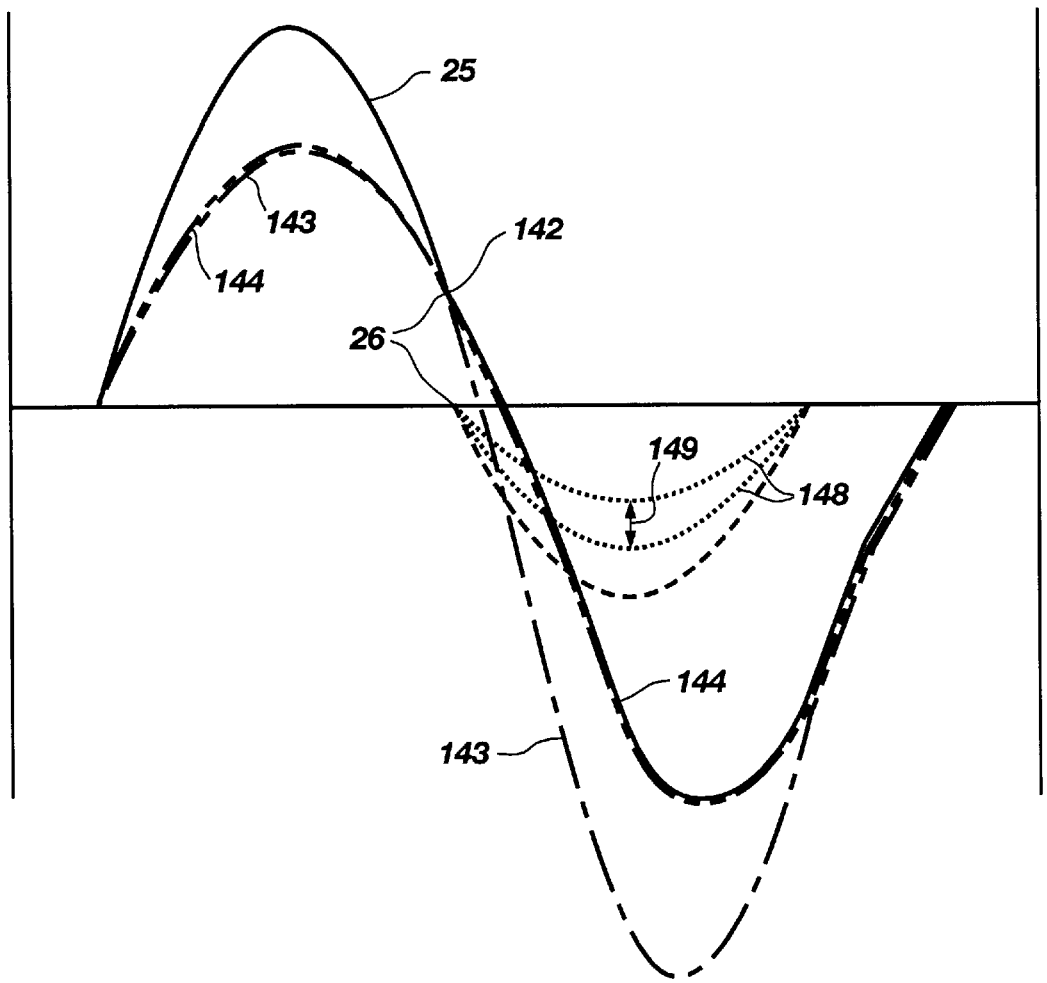
FIG. 6 Combined information wave with extraction waves for initial steps in component extraction.

The method shown in FIGS. 5 through 8 illustrates an embodiment with the extraction process beginning with the highest frequency component information wave 139. Referring again to FIG. 5, for this illustration the first half cycle segment 140 of each of the component information waves is a reference segment and is of a known wave form, frequency and amplitude, and the second half cycle segment 141 is the information segment and is of a known wave form and frequency, but of an unknown amplitude. Since the amplitude is known, the first half cycle segment, the reference segment, of the highest frequency component information wave can be subtracted out, as shown in FIG. 6, leaving the second half cycle and a first resultant discontinuity 142 in a first resultant wave 143 at the zero amplitude crossing point 26 of the highest frequency component information wave. Next the extraction of the information segment is accomplished by extraction waves 148 of progressively larger amplitude having the known frequency and wave form of the information segment being subtracted from the first resultant wave. Amplitude iterations 149 of the extraction waves are kept as small as needed to achieve the desired accuracy of matching with the information segment. The subtraction of the progressively larger extraction waves continues for the information segment until the discontinuity 142 of the resultant wave at the zero crossing point of the highest frequency component information wave is eliminated, thereby producing a second resultant wave 144. The extraction wave which results in the elimination of the discontinuity 142 is the information segment for the selected component information wave.

Figure 7:
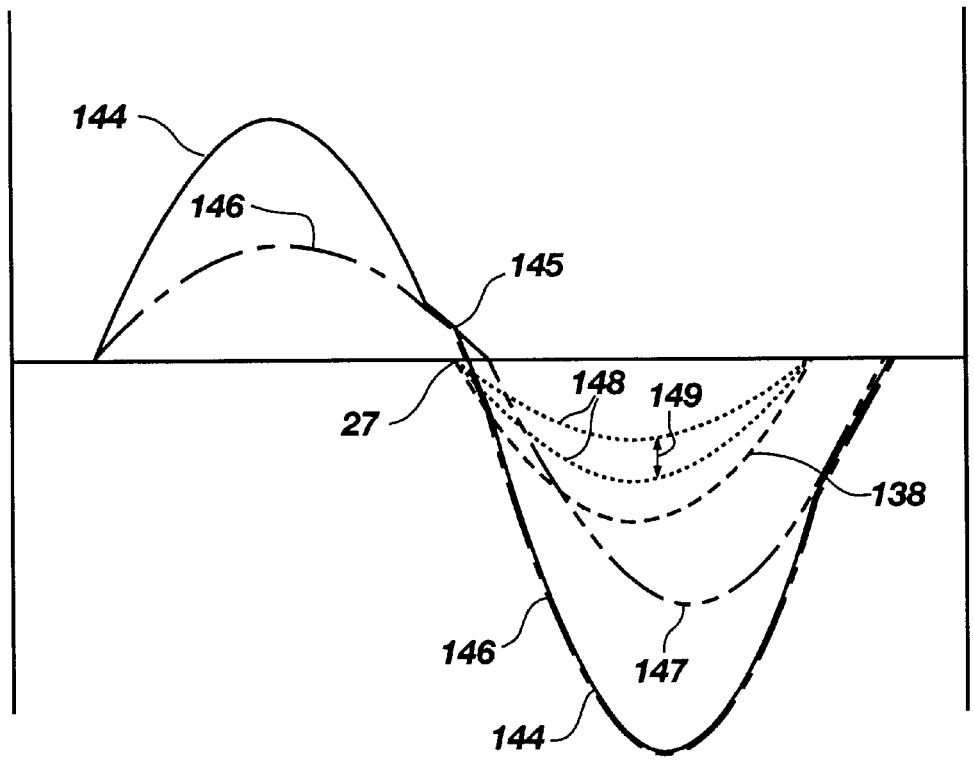
FIG. 7 Combined information wave with extraction waves for subsequent steps in component extraction.

Referring then to FIG. 7, the known reference segment of the second highest frequency component information wave is then subtracted from the second resultant wave, thereby creating the second resultant discontinuity 145 in a third resultant wave 146 at a point corresponding to the zero crossing point 27 of the second highest frequency component information wave. Next, progressively higher amplitude extraction waves 148 having the known frequency and wave form of the information segment of the second highest frequency component information wave are subtracted from the third resultant wave until the second resultant discontinuity 145 is eliminated, thereby producing a fourth resultant wave 147. The extraction wave which results in the elimination of the second resultant discontinuity is the information segment for the second highest frequency component information wave. Again, the amplitude iterations are kept as small as needed to attain the desired degree of accuracy of matching for the information segment.

Figure 8:
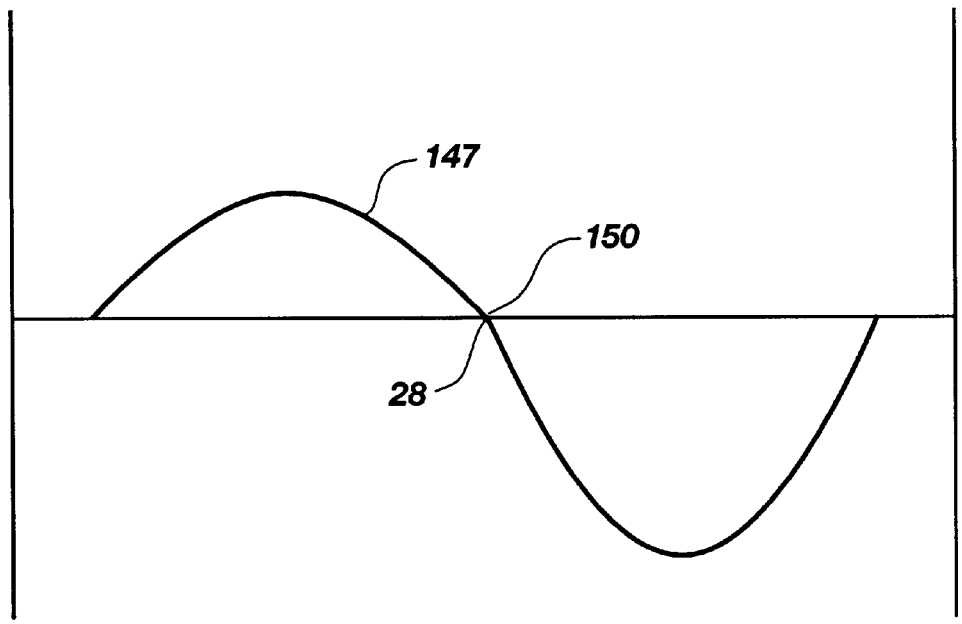
FIG. 8 Zero crossing point and discontinuity for component extraction.

Referring next to FIG. 8, the fourth resultant wave 147 is the combined information wave with the highest and second highest frequency component information waves subtracted out, and, therefore, for the illustrated example, is the lowest frequency component information wave. By subtracting the known reference segment of the lowest frequency component information wave, the information segment of this wave is determined. A third resultant discontinuity 150 is produced at the zero crossing 28 of this wave, which is the beginning point of the information segment. A zero check can be made at this point to see if the third resultant discontinuity falls on the zero amplitude axis. If it does not, due to interference or accumulated error in the extraction process, a correction can be made to this information segment or a correction can be made to each of the extracted information segments in accordance with a selected algorithm.

For embodiments wherein the combined information wave incorporates more than three component information waves, the steps illustrated in FIG. 6 and 7 are repeated as many times as necessary to complete the extraction of the information segments for each of the component information waves. The process is then concluded with the steps illustrated by FIG. 8. Again, a zero check can be made with corrections made to the information segment of the last extracted component information wave or to each of the extracted component information waves in accordance with a selected algorithm.

Other embodiments may provide that when each half cycle has been extracted it becomes a known segment and can be used as the reference for the next half cycle. Then as a half cycle is extracted, it will eliminate the discontinuity in the resultant wave at the start of the half cycle and create a discontinuity at the start of the next half cycle. The process continues until all of the component information waves have been extracted and are available for demodulation.

The method described for these embodiments alternatively may provide that, by determining the slope change of the resultant wave at the point of discontinuity which corresponds to the zero crossing of a component information wave, the known amplitude and wave form of the reference segment and the known wave form of the information segment can be used with the slope change to determine the amplitude of the information segment. There is one and only one amplitude for an information segment of a given wave form that will result in a specific slope change between the reference segment and the information segment. After the information segment is determined for the first selected component information wave, this component information wave, which is comprised of the known reference segment and the determined information segment, is subtracted from the combined information wave. The extraction process is then repeated for each of the remaining component information waves until all of the information is extracted. For preferred embodiments, the order of extraction will be in order of increasing or decreasing frequency. However, other embodiments may utilize any selected order of extraction.

Figure 9:
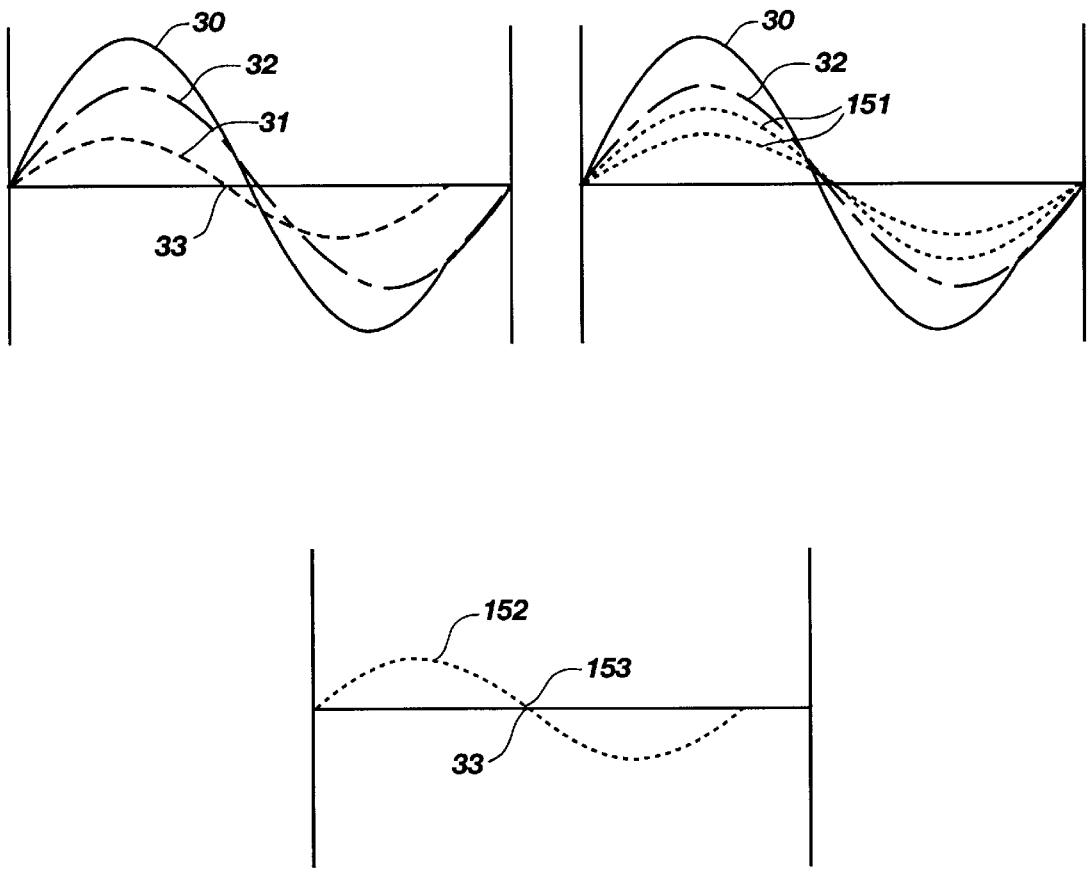
FIG. 9 Combined information wave comprised of two component information waves with extraction waves for component wave extraction.

FIG. 9 illustrates a combined information wave 30 which is comprised of only two component information waves, a first component information wave 31 and a second component information wave 32. For this combined information wave, a simplified embodiment of the present invention can be used for separating the component information waves. As with other embodiments, if the waves are symmetrical as shown in FIG. 9, i.e. the positive and negative segments have the same amplitude, the positive and negative segments may be extracted simultaneously.

For this simplified embodiment, one of the component waves 32 is selected for extraction and progressively higher amplitude extraction waves 151 of the known wave form and frequency of the selected component wave are subtracted from the combined wave until the resultant wave 152 has a zero amplitude crossing 153 which matches the known wave form, frequency and zero crossing 33 of the second component wave. When this occurs the extraction wave is the selected component wave and the residual wave is the second component wave. The component information waves can then be demodulated.

For the embodiment illustrated in FIG. 9, one of the component information waves may be a reference wave and may be used for calibration of the other component information wave.

Figure 10:
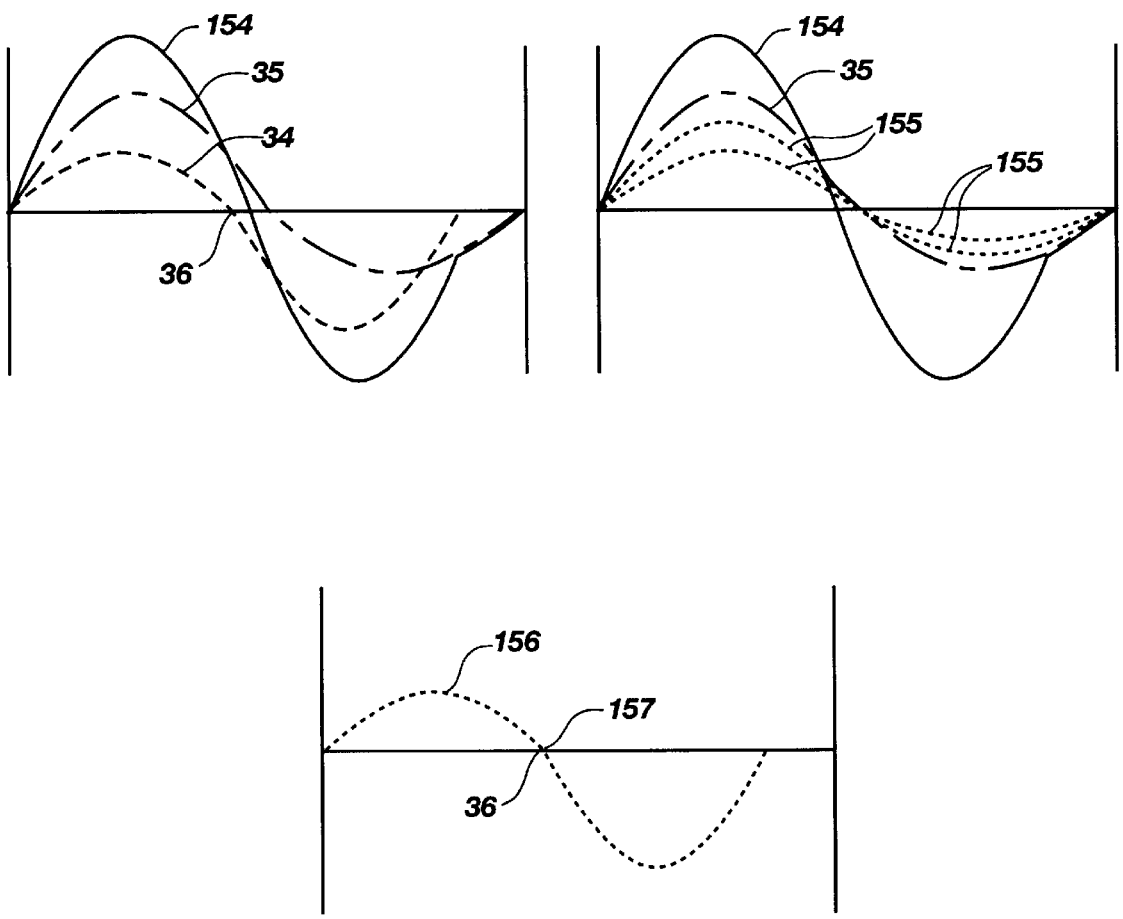
FIG. 10 Combined information wave comprised of two component information waves with extraction waves for component wave extraction.

If, as shown in FIG. 10, the component information waves are not symmetrical, each half cycle segment must be extracted separately. Extraction waves 155 for each half cycle of one of the component information waves, such as the second component information wave 35 as shown in FIG. 10, are subtracted from the combined information wave 154, thereby producing a resultant wave 156. When the zero crossing 157 of the resultant wave matches the zero crossing 36 of the first component information wave 34, the extraction wave segments effecting this zero crossing match are equal to the second component information wave segments and the resultant wave segments are equal to the first component information wave segments.

The embodiments described above in FIGS. 9 and 10 for use with a combined wave that is comprised of two component waves can be simplified further if one of the two component waves is transmitted continuously as a reference wave with a known wave form, amplitude and frequency. Generally, for these combined waves, the reference wave will also have a frequency which defines the time period of the time slots allocated to the information wave. For these embodiments, the reference wave is subtracted out of the combined wave, leaving the information wave. A zero check and correction for the zero crossing of the second component information wave can be used to correct for effects of interference and other errors.

Figure 11:
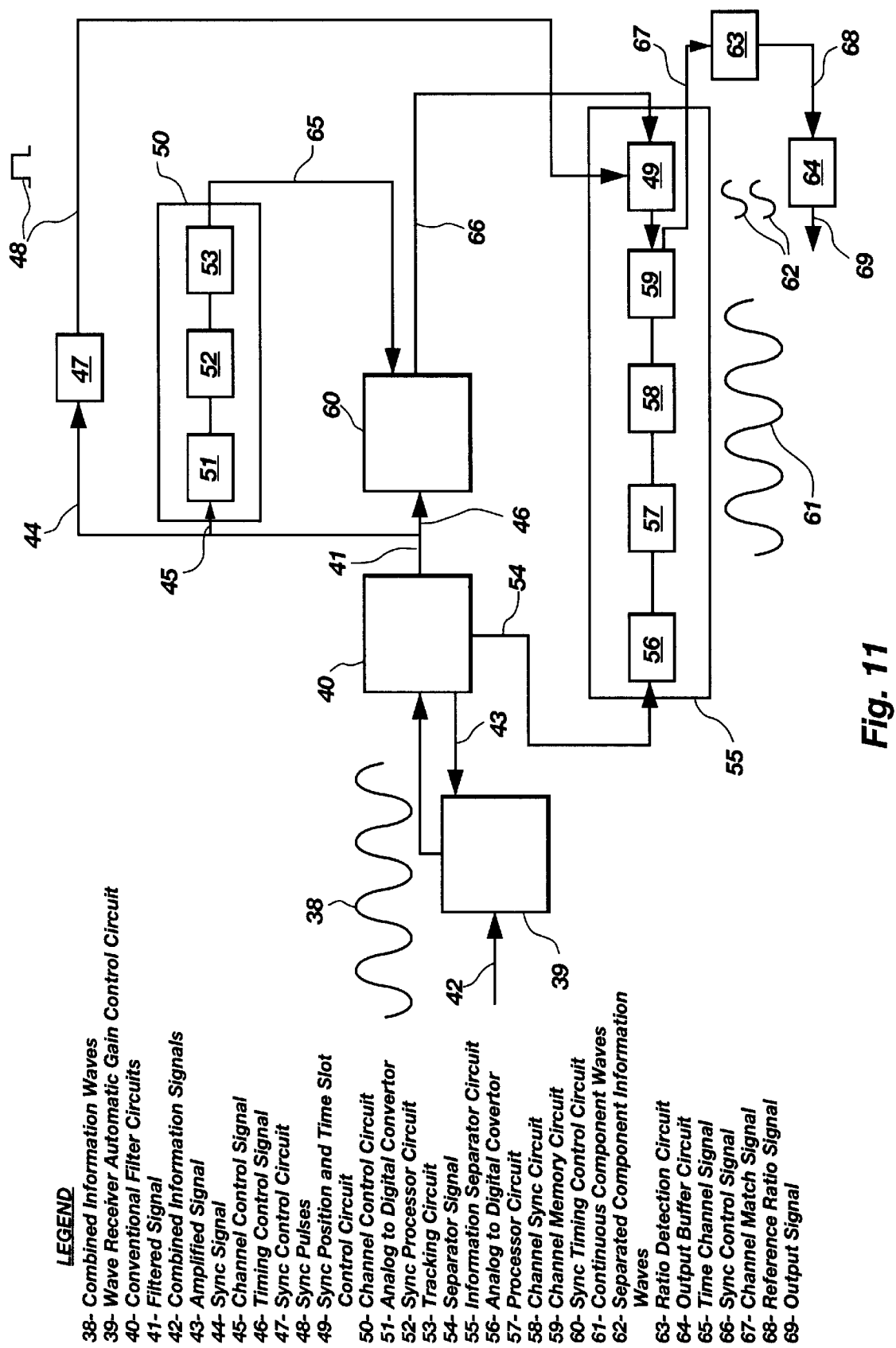
FIG. 11 Schematic of component information wave extraction apparatus.

A schematic of a preferred embodiment of a receiver circuit of the present invention which is used to filter combined information signals is shown in FIG. 11. This embodiment of the receiver circuit is utilized for filtering combined information signals 42 transmitted and received as described in the prior related applications. Also, this receiver circuit is used for combined information waves 38 that have been multiplied for amplitude adjustment so that all of the cycles of the received waves are symmetrical and have the same amplitude as shown on FIG. 13.

The wave receiver and automatic gain control circuit 39 amplifies and controls the power level of the received signals. The amplified signal 43 is then filtered through conventional filter circuits 40, and the filtered signal 41 is split four ways 44, 45, 46, 54.

One portion of the split and filtered signal, the sync signal 44, passes to the sync control circuit 47 which includes a clock circuit that is continuously synchronized to the reference component of the received combined information wave. The sync control circuit generates sync pulses 48 which are synchronized to the reference component of the received information wave, thereby defining the time slots for the received information components. The sync pulses are then passed to a sync position and time slot control circuit 49.

Another portion of the split, filtered signal, the channel control signal 45, is passed to a channel control circuit 50 which consist of an analog to digital convertor 51, a sync computer processor circuit 52 with memory which stores and separates the filtered wave, and a tracking circuit 53 that tracks the time channels. The time channel signal 65 is passed to the sync timing control circuit 60. Another portion of the split, filtered signal, the timing control signal 46, passes to the sync timing control circuit.

The final portion of the split, filtered signal, the separator signal 54, passes to the information separator circuit 55. The information separator circuit consists of an analog to digital convertor 56, a processor circuit 57 with memory and programmed algorithms to separate the component waves, a channel sync circuit 58, a channel memory circuit 59, and the sync position and time slot control circuit 49.

The signal is received and the power level is measured by the filter circuit 40 and an amplified signal 43 is sent back to the wave receiver and automatic gain control circuit 39 to control the receiver gain. Because the signal appears to a conventional filter circuit as a continuous wave the signal portion passes through the filter 40 with little distortion. This circuit can be a narrow bandpass filter.

Once the proper channel is detected, the sync timing control circuit 60 sends a sync control signal 66 to the sync position and time slot control circuit 49. If the channel number matches, as determined by the channel memory circuit 59, a channel match signal 67 is passed to the ratio detection circuit 63. In this circuit the ratio of the amplitude of the component information wave to the amplitude of the reference wave, a reference ratio 68 signal, is determined and is stored in the output buffer circuit 64. The continuous component waves 61 can then be separated by the method and means disclosed for the present invention to its components 62 by channel for the output signal 69.

Figure 12:
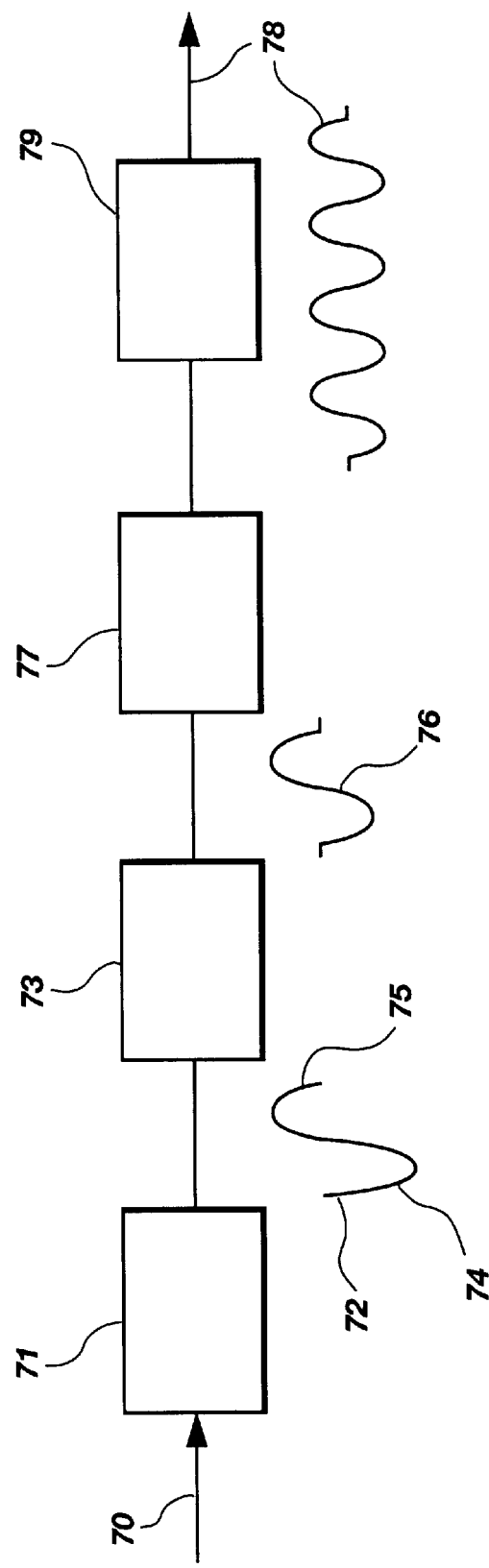
FIG. 12 Schematic of combined information wave amplitude adjustment apparatus.

FIG. 12 shows an embodiment of an amplitude adjustment circuit that is utilized with preferred embodiments of the present invention and in conjunction with the prior related inventions. This circuit provides for the component information wave or waves to be combined with a reference wave of a selected frequency and amplitude. This embodiment is well suited for combined information waves wherein the component information waves and the reference wave have a common mid-cycle zero amplitude crossing but has general application for combined information waves with a reference component. The positive and negative segments are multiplied by selected factors so that both the half cycle segments are the same amplitude and the amplitudes of both half cycle segments are adjusted to a selected amplitude before transmitting. The component information waves 70 are passed to a reference circuit 71 which adds the reference wave and the component information waves. The combined information wave 72 is a non-symmetrical wave having a negative segment 74 and a positive segment 75 of different amplitudes. An equalizer circuit 73 equalizes the amplitudes of the positive and negative segments by multiplying both the negative and positive segments by appropriate factors. This results in a symmetrical adjusted combined information wave 76 of a selected amplitude. Composite circuit 77 combines the single adjusted information waves into a continuous amplitude adjusted combined wave 78 with each cycle having the same amplitude. The continuous combined wave is then passed to the transmitter 79 where the wave is transmitted as provided by the prior related inventions.

Figure 13:
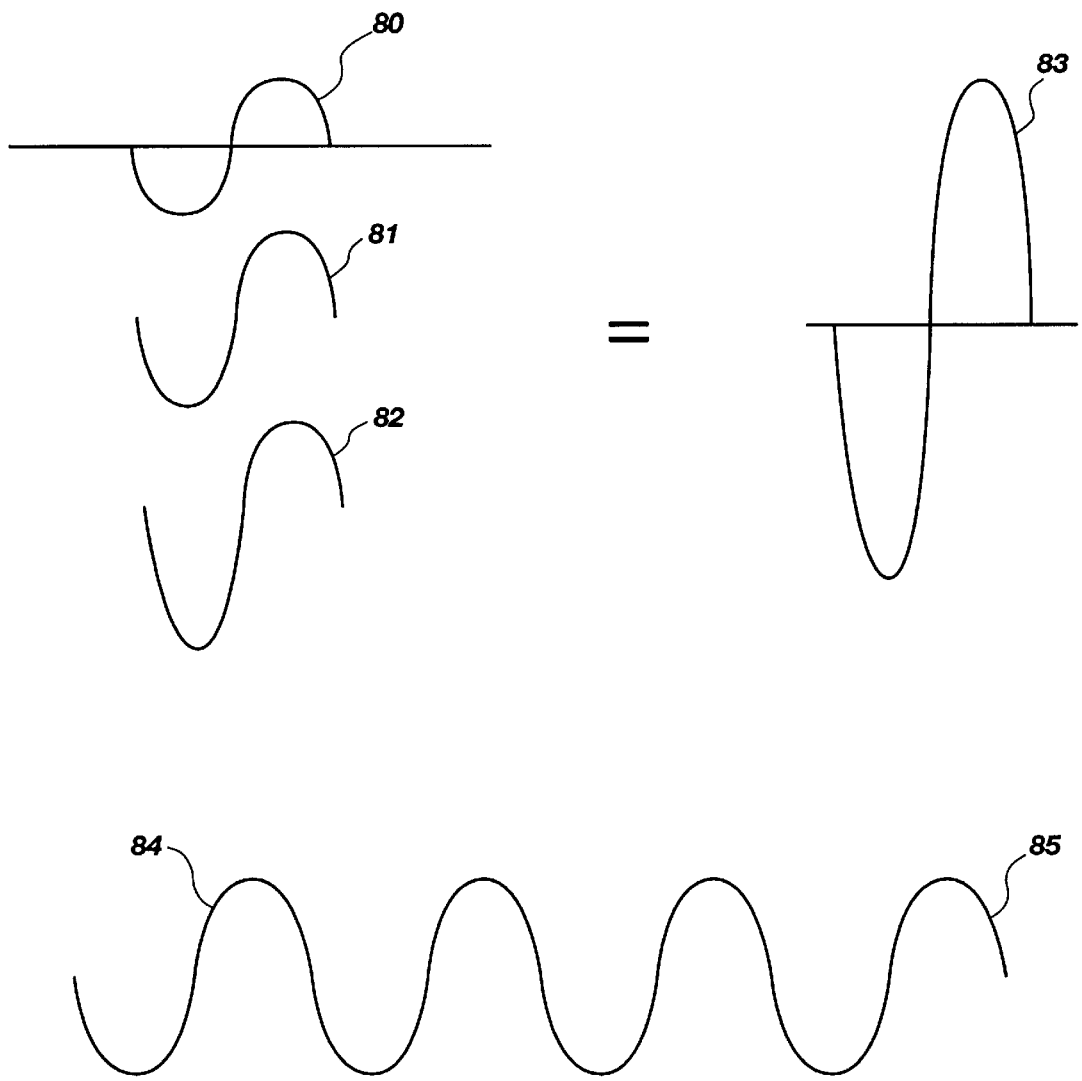
FIG. 13 Illustration of combined information wave comprised of two component information waves and a reference wave, and amplitude adjustment of the combined information wave.

FIG. 13 illustrates the steps of combining the component information waves 81, 82 and the reference waves 80 and adjusting the amplitude of the combined information wave 83. The amplitude of each half cycle of the combined information wave 83 can be changed without affecting the ratio of the component information waves 81, 82 to the reference wave 80. The amplitude of each half cycle of the combined information wave 83 is adjusted by multiplying each half cycle by an appropriate factor. The actors are different for each half cycle and the adjusted combined information wave 84 will have equal negative and positive amplitudes and those amplitudes be pre-selected. This process is repeated for each successive cycle producing a continuous combined wave 85. Because for the preferred embodiments the reference wave and component information waves are close in frequency, the combined wave 85 will pass through conventional filters with very little distortion.

Figure 14:
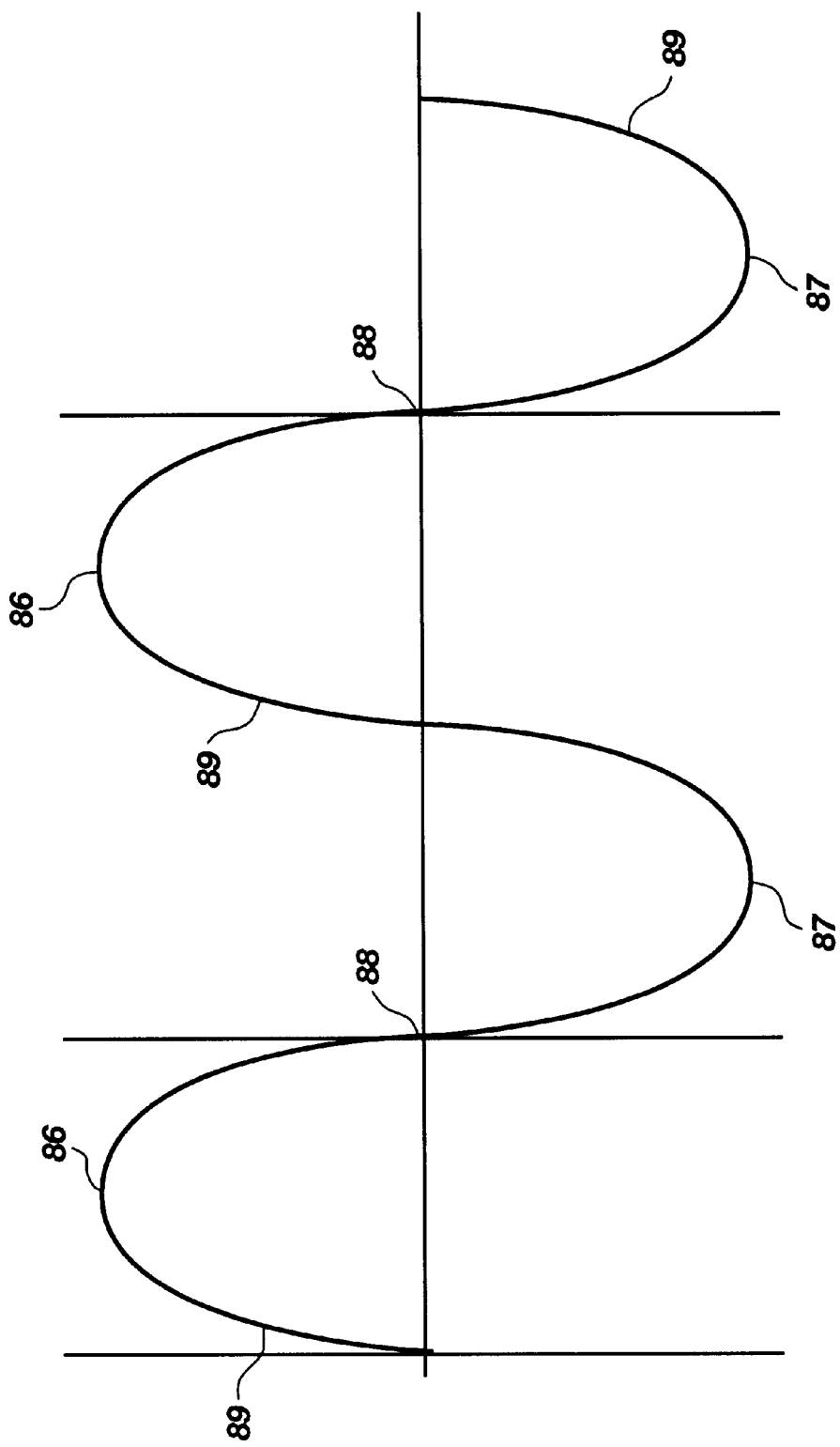
FIG. 14 Combined information wave positive and negative segments and zero crossing points.

The combined wave 89 shown in FIG. 14 is comprised of a reference wave and an information wave. However, more than one information wave can be included. The information wave is discontinuous at the zero amplitude crossing point 88. In order to synchronize the receiver and to determine the zero amplitude crossing point, the sum of the amplitude of the positive segment 86 and the amplitude of the negative segment 87 are added and divided by two. The zero crossing point can then also be used to synchronize the receiver for each cycle of the wave.

Figure 15:
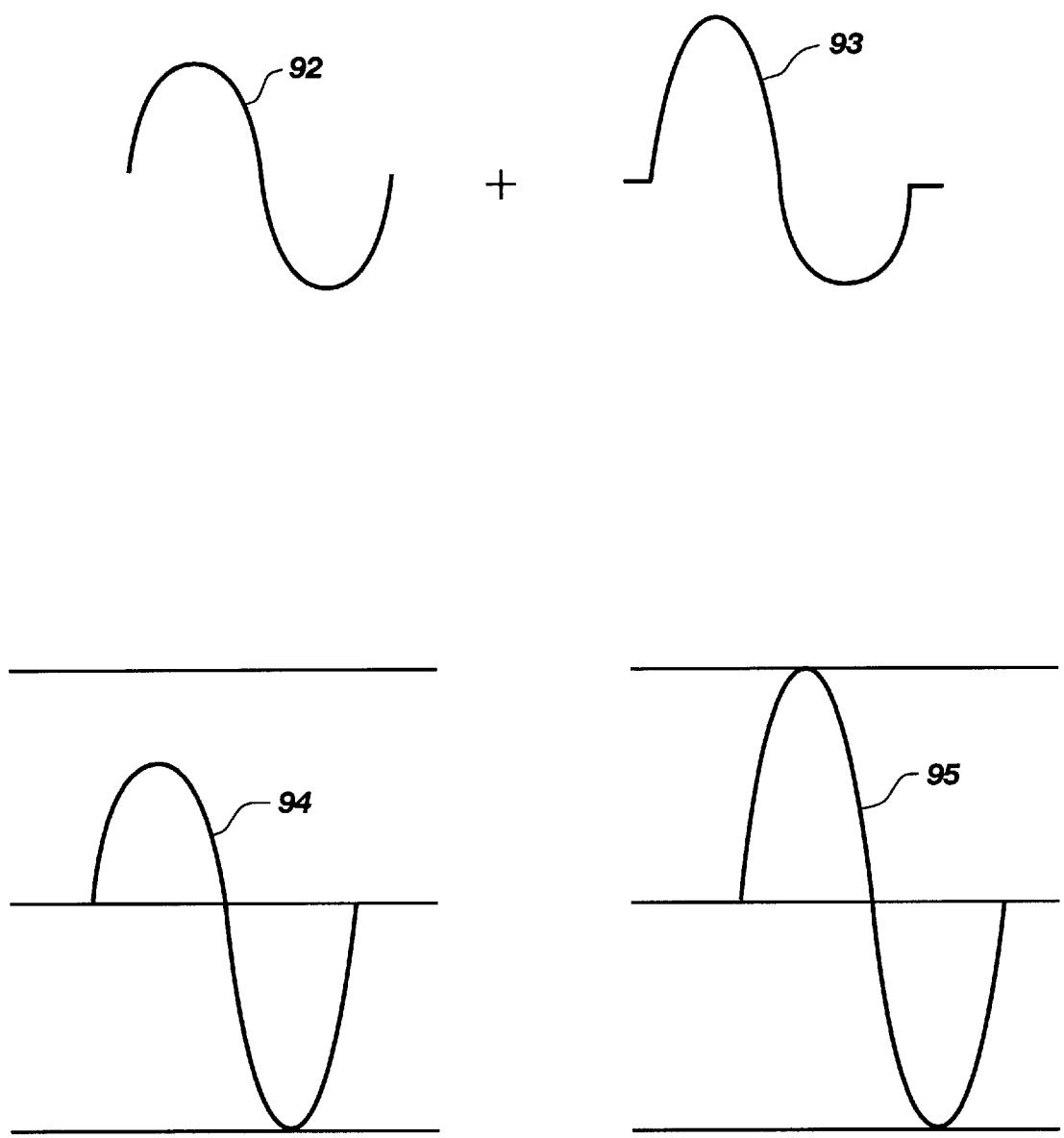
FIG. 15 Combined information wave comprised of a reference wave and one component information wave with amplitude adjustment.

FIG. 15 illustrates how embodiments of the present invention can be used to transfer information from a computer read/write head as stacked sine waves. This allows for more than one bit per cycle to be transmitted and stored. The wave that is best suited to transfer from head to disk with the least amount of distortion is a sine wave.

Using one wave as a reference wave 92 and combining that reference wave with an analog sine wave which is an information wave 93, a combined wave is created 94. This combined wave is then amplitude adjusted as provided by the present invention to provide an adjusted combined wave 95 with equal positive and negative amplitudes. If a sine wave is utilized, information at four bits per half cycle is stacked on the sine wave with the reference wave, resulting in multiple bits per cycle being transmitted and stored onto the magnetic media as illustrated in FIG. 16.

Figure 16:
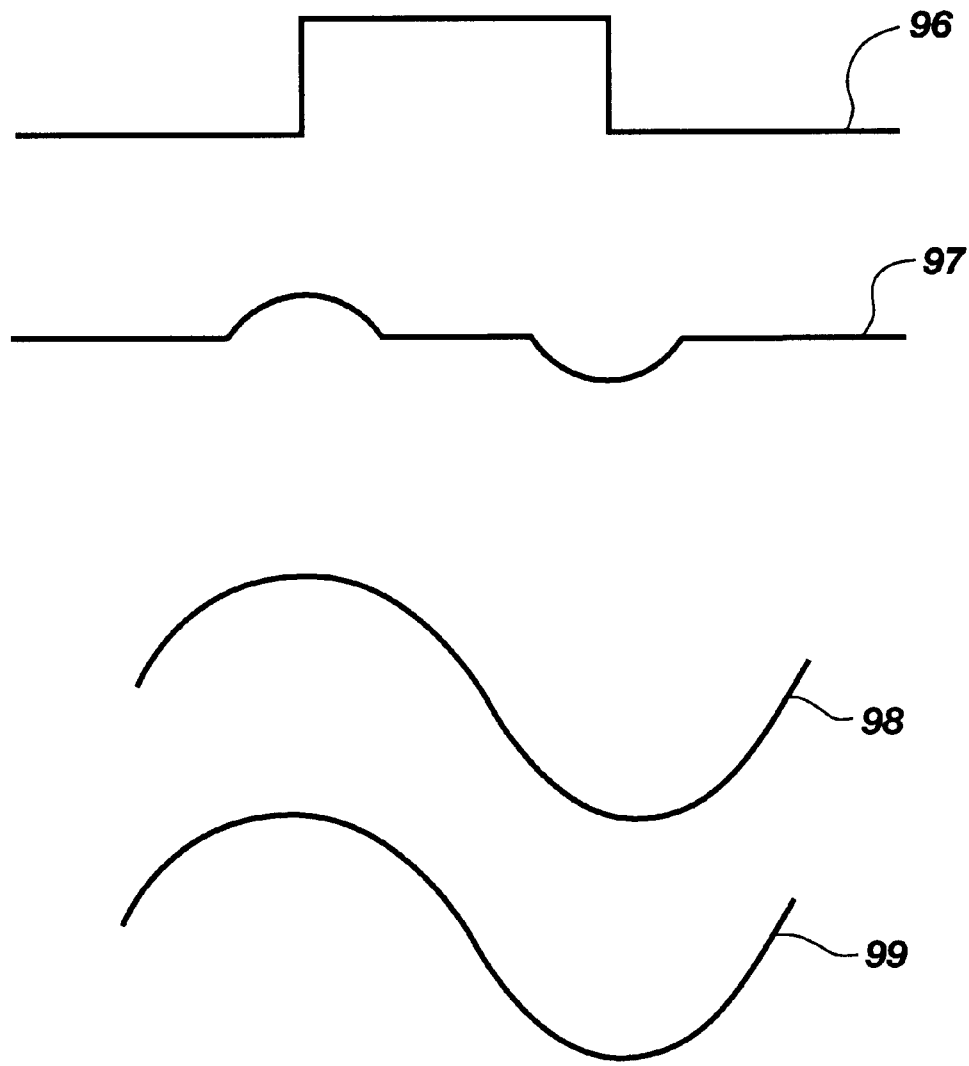
FIG. 16 Conventional step wave for data storage and contrasted to information wave comprised of reference wave and a component information wave of the present invention.

FIG. 16, illustrates a conventional step wave 96 that is used for magnetic storage devices. For embodiments of the present invention used for magnetic storage devices, the amplitudes of two waves, an information wave 97 and a reference wave 98, combined together as a combined wave 99, remain proportional even after transmission degradation. The information carried by the information wave is in constant ratio to the reference wave in the combined wave 99. Now, even when the distance of the read/write head changes, the original wave forms can be recovered from the storage medium by extracting the waves and restoring them to their original amplitude ratios by the filter embodiments of the present invention. In this way the information on the information wave is "protected" by its relationship to the reference wave.

This storage function of the present invention offers at least eight bits per cycle capacity using just one reference and one component information sine wave combination with additional component information waves, proportionally greater information can be stored for each cycle. The eight bits stored using the resent invention would appropriate no more space than is now being required to store one bit. This means a potential for a major step function in storage capacity within current space and magnetic medium standards for storage hardware.

Another preferred embodiment of the present invention for extracting component waves from a combined wave is illustrated by FIG. 17, FIG. 18, FIG. 19, FIG. 20 and FIG. 21. The method illustrated is for one component information wave and one reference wave. However, this method is not limited to just one component information wave.

Figure 17:
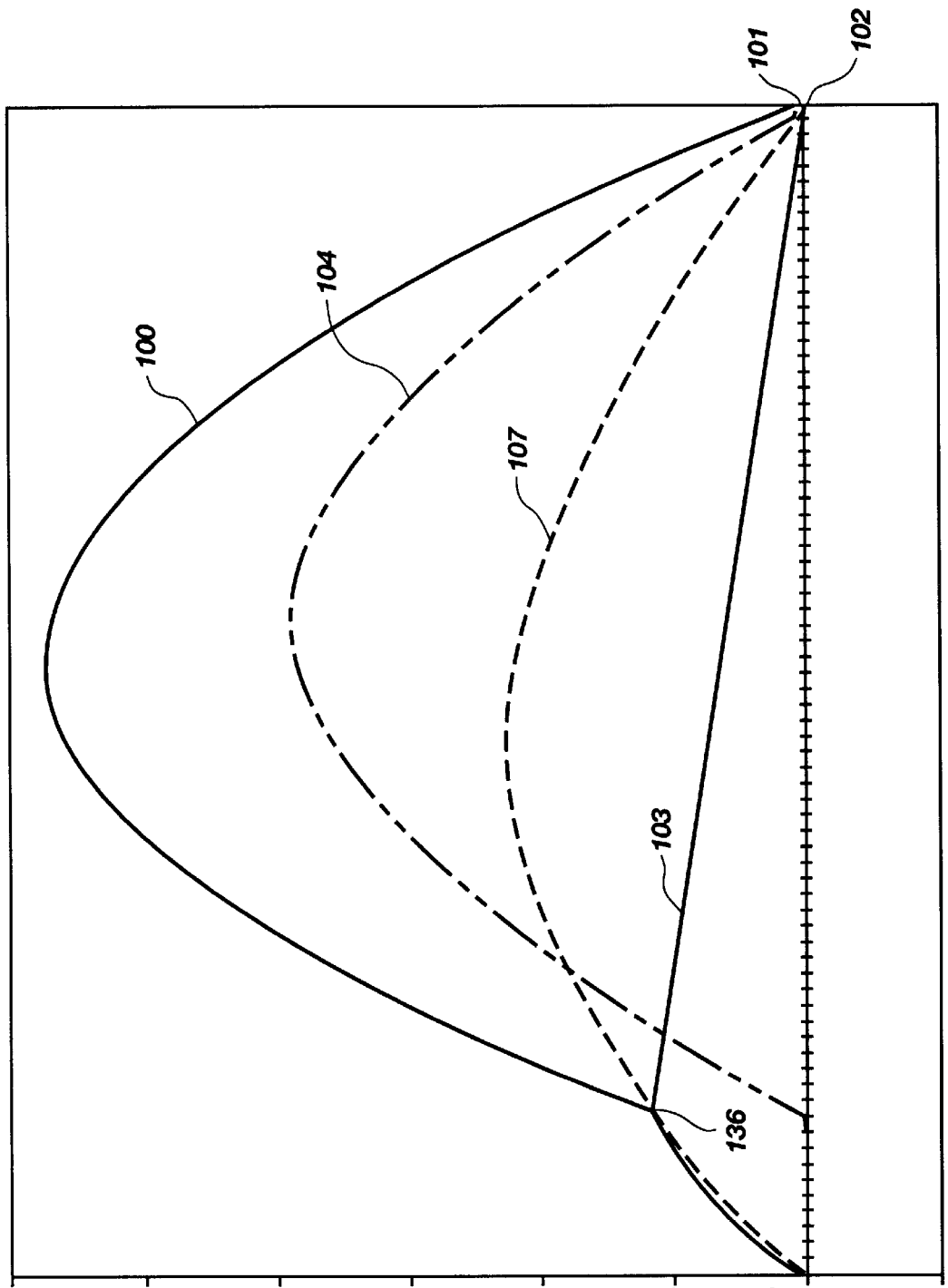
FIG. 17 Positive cycle of combined information wave with initial steps of component wave extraction.

Referring to FIG. 17, a half cycle of a combined wave 100 is illustrated which is comprised of a reference wave 107 and a component information wave 104. This combined information wave has a zero crossing which coincides with the zero crossing of the reference wave 101 and the zero crossing of the component information wave 102. This common mid-cycle zero crossing can be used by these embodiments for synchronizing or re-synchronizing the received waves to assigned time slots.

The first step in the extraction process comprises establishing a first relative zero axis 103 of the component information wave which starts on the combined information wave at the zero phase point 136 of the component information wave and continues to the zero crossing point of the reference wave 101 and the component information wave 102.

Figure 18:
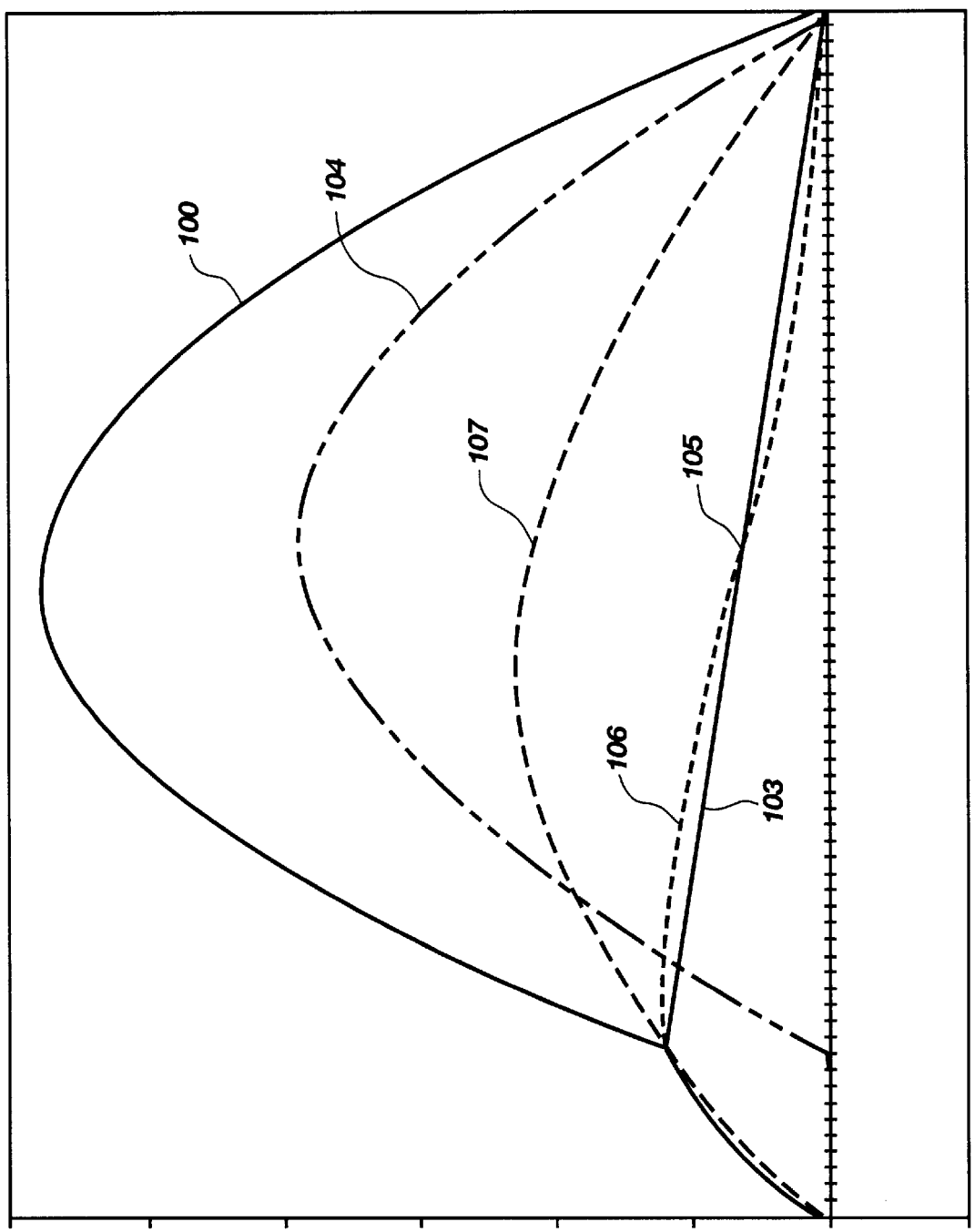
FIG. 18 Positive cycle of combined information wave with further steps of component wave extraction.

FIG. 18 shows the second step in the process of separating the component information wave 104 from the combined wave 100. This involves subtracting out extraction waves with progressively higher amplitudes which have the same wave form, frequency and phase as the component information wave until the resultant wave 106 reaches the relative zero axis 103 at the ninety degree phase point 105 of the component wave. Any phase point can be used as long as the same phase is used each time.

Figure 19:
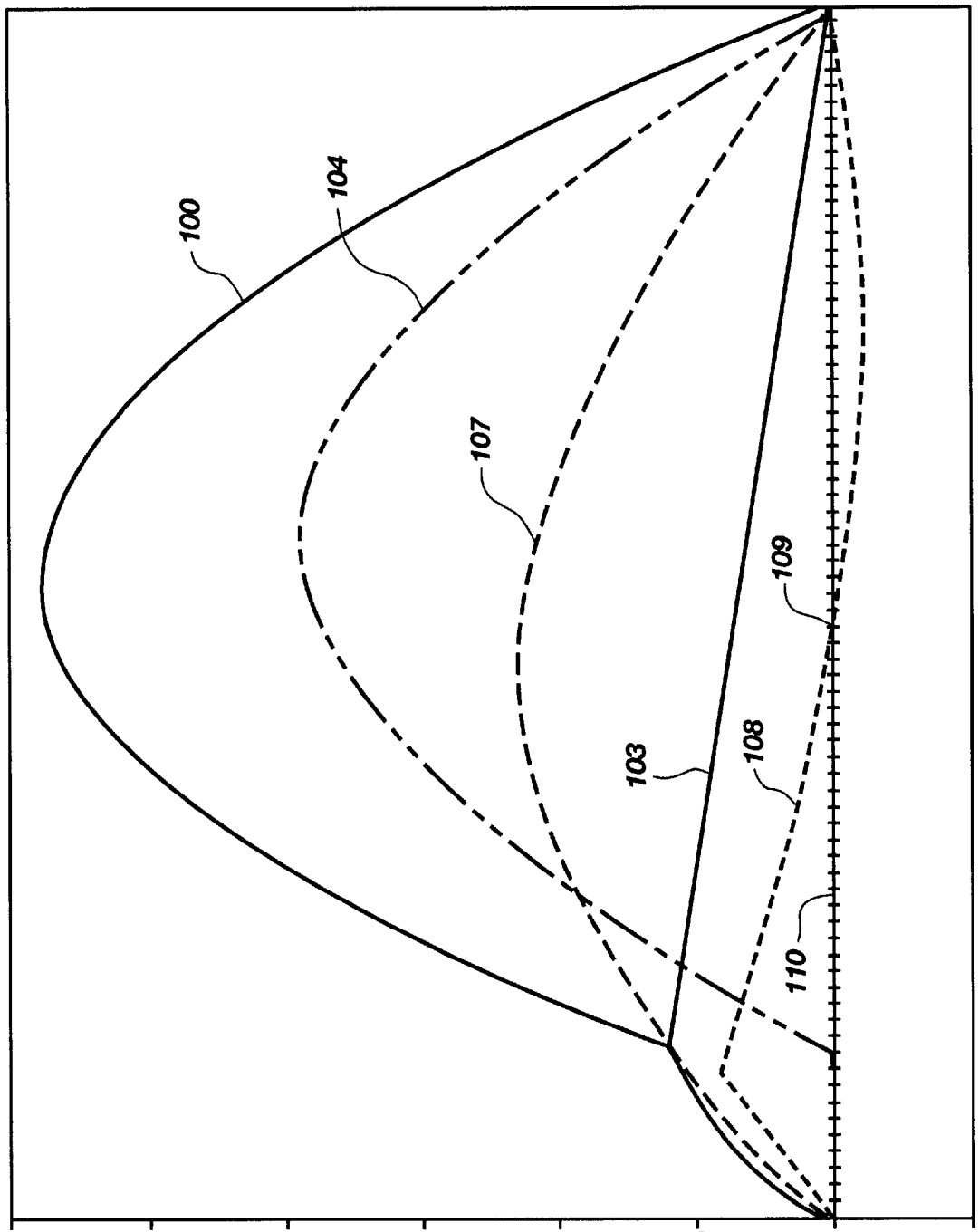
FIG. 19 Positive cycle of combined information wave with further steps of component wave extraction.

The next step is shown in FIG. 19. Progressively higher amplitude extraction waves with the same wave form, frequency and phase as the reference wave 107 is subtracted out of the resultant wave 106 shown in FIG. 18 until the ninety degree phase point 109 of the second resultant wave 108 matches the zero amplitude axis 110. Again, any phase point can be used as long as it is the same each time.

Figure 20:
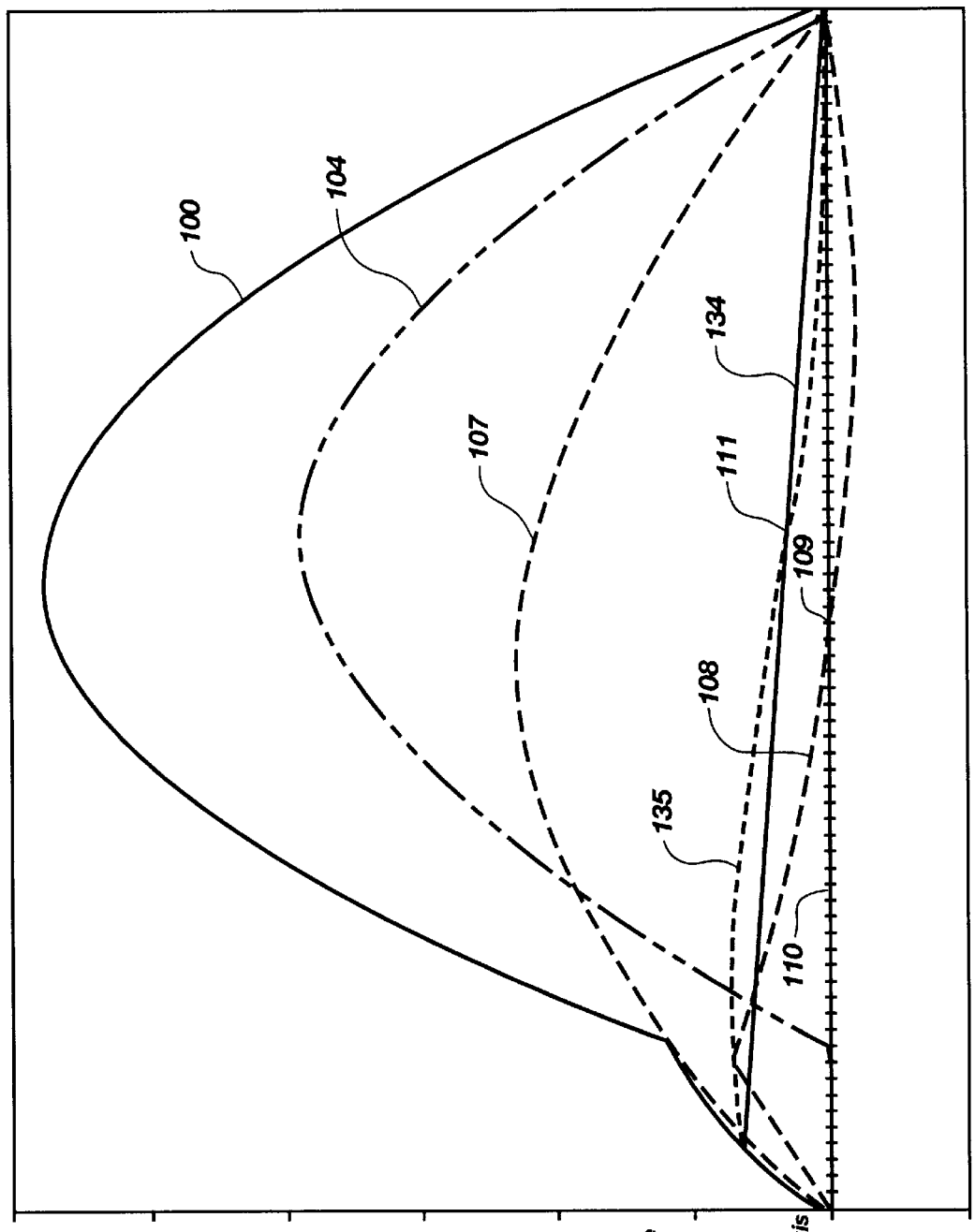
FIG. 20 Positive cycle of combined information wave with further steps of component wave extraction.

The next step is shown in FIG. 20. A second relative zero axis 134 is drawn half way between the first relative zero axis 103 shown in FIG. 17 and the actual zero amplitude axis 110. Extraction waves of progressively increasing amplitude and with the wave form, frequency, and phase of the component information wave are added back into the second resultant wave 108 until the 90 degree phase point 111 or the same phase point used for the relative zero axis 103 on FIG. 18, matches the second relative zero axis 134, thereby producing a third resultant wave 135.

The next step is shown in FIG. 21. Progressively larger amplitude extraction waves with the same wave form, frequency and phase as the reference wave are then subtracted from the resultant until the ninety degree phase point 136 of the fourth resultant wave 156 matches the zero amplitude axis 110.

The steps shown in FIG. 20 and FIG. 21, are repeated until the reference wave ninety degree phase point and the component information wave ninety degree phase point both converge to the zero amplitude axis to the desired degree of accuracy, and the relative zero axis 113 thus converges to the zero amplitude axis. The amplitude of the component information wave will then be the net total amount of the component information extraction waves subtracted out for the component information waves and the reference wave amplitude will be equal to the net total amount of the extraction waves subtracted out for the reference wave.

FIG. 22 shows a schematic of a preferred embodiment apparatus of the present invention which incorporates a distortion correction apparatus. The distortion correction apparatus can also can be utilized generally with wave signals to compensate for distortion imposed by a receiver filter or other signal processing circuit. This apparatus prepares combined information waves to facilitate passing them through conventional filters utilized by a variety of communications and data transfer devices, while minimizing the distortion of the received waves by the filters. First the component information waves 114 and the reference wave 115 are combined by an adder circuit 117 to form a combined information wave 116. The combined waves 116 then pass to a wave shaper 118. After the wave has been shaped the wave is passed to the wave multiplier and wave train circuit 120. The wave is multiplied in the wave shaper 118 by selected factors on a half cycle basis producing an equalized wave 119 with positive and negatives segments of equal amplitudes. The equalized positive and negative amplitudes are then further proportionally adjusted by the wave multiplier and wave train circuit 120 to produce an amplitude adjusted wave 121 with pre-selected and equal positive and negative amplitudes. The amplitude adjusted wave is also added by the wave multiplier and wave train circuit to other amplitude adjusted waves to form a train of amplitude adjusted waves 122 all having the same amplitudes for both their positive and negative segments. The train of amplitude adjusted waves then passes to a filter 123 that is the same as the filter to be utilized at the receiver, producing a filtered wave 159 for each wave in the train of waves. The waves are then separated from the effects of the filter by a wave subtracter 124. The output of the wave subtracter for each wave is the filter response 125 which is the wave difference between the filtered wave 159 and the amplitude adjusted wave 121 before passing through the filter. This response of the filter is then one hundred eighty degree phase shifted and added back into the original adjusted wave 121 by a wave filter adder 126 to form a filter biased wave 127. The train of filter biased waves then passes to a transmitter 128 or other signal conveying device for transmitting the amplitude adjusted and filter biased signal to a receiver. This provides a means of preparing the waves to pass through a conventional filter at the receiver with the distortion induced by the receiver filter minimized or neutralized.

For other embodiments, the interference or distortion effect of any receiver filter or filter system on the received information wave is compensated for mathematically. Since the interference or distortion imposed by any filter or filter system on a wave can be predicted mathematically, these embodiments provide for the inverse of the predicted interference or distortion for each wave cycle to be added to the cycle prior to transmission. The effect of the conventional filter or filter system at the receiver is thus neutralized in a manner similar to that provided by the embodiment disclosed in FIG. 22.

The list of items that could be improved by using the various embodiments of the method and the various embodiments of the apparatus disclosed is, as persons skilled in the art will recognize, enormous.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Method for reducing the distortion imposed upon a combined information wave by a filter system or other signal processor, said combined information wave comprising a reference wave and one or more component information waves of known and distinct frequencies, said reference wave having positive and negative segments of known amplitudes, said combined information wave having positive and negative segments, and said method comprising adjusting the amplitudes of the positive and negative segments of the combined information wave such that the positive and negative segments have pre-selected and equal amplitudes, thereby producing an amplitude adjusted combined information wave with positive and negative segments of pre-selected and equal amplitudes.

2. Method claimed in claim 1 wherein the step of adjusting the amplitudes of the positive and negative segments comprises the steps of:
   a) multiplying the positive segment of the combined information wave by a factor which adjusts the amplitude of the positive segment to a pre-set amplitude; and
   b) multiplying the negative segment of the combined information wave by a factor which adjusts the amplitude of the negative segment to a pre-set amplitude which is equal to the pre-set amplitude of the positive segment.

3. Method claimed in claim 1 further comprising the steps of:
   a) predicting a distortion effect that a filter system or other signal processor, through which the amplitude adjusted combined information wave will pass at a receiver, would have on the amplitude adjusted combined information wave, and
   b) adding a filter correction wave, which is the inverse of the predicted distortion effect, to the amplitude adjusted combined information wave, thereby producing a filter biased wave.

4. Method for reducing the distortion imposed upon a combined information wave by a filter system or other signal processor, said combined information wave comprising a reference wave and one or more component information waves of known and distinct frequencies, said reference wave having positive and negative segments of known amplitudes, said combined information wave having positive and negative segments, said method comprising the steps of:
   a) adjusting the amplitudes of the positive and negative segments of the combined information wave such that the positive and negative segments have pre-selected and equal amplitudes thereby producing an amplitude adjusted combined information wave with positive and negative segments of pre-selected and equal amplitudes;
   b) passing the amplitude adjusted combined information wave prior to transmission through a filter system or signal processor which is identical to the filter system or signal processor through which the amplitude adjusted combined information wave will pass at a receiver, thereby producing a pre-filtered wave;
   c) inverting the pre-filtered wave;
   d) adding the inverted pre-filtered wave to the amplitude adjusted combined information wave, thereby producing a filter correction wave; and
   e) adding the filter correction wave to the amplitude adjusted wave, thereby producing a filter biased wave.

5. Method claimed in claim 4 wherein the step of adjusting the amplitudes of the positive and negative segments comprises the steps of:
   a) multiplying the positive segment of the combined information wave by a factor which adjusts the amplitude of the positive segment to a pre-set amplitude; and
   b) multiplying the negative segment of the combined information wave by a factor which adjusts the amplitude of the negative segment to a pre-set amplitude which is equal to the pre-set amplitude of the positive segment.

6. Method for reducing the distortion imposed upon a combined information wave by a filter system or other signal processor, said combined information wave comprising a reference wave and one or more component information waves of known and distinct frequencies, said reference wave having positive and negative segments of known amplitudes, said combined information wave having positive and negative segments, said method comprising the steps of:
   a) adjusting the amplitudes of the positive and negative segments of the combined information wave such that the positive and negative segments have pre-selected and equal amplitudes thereby producing an amplitude adjusted combined information wave with positive and negative segments of pre-selected and equal amplitudes;
   b) predicting a distortion effect that a filter system or other signal processor, through which the amplitude adjusted combined information wave will pass at a receiver, would have on the amplitude adjusted combined information wave, and
   c) adding a filter correction wave, which is the inverse of the predicted distortion effect, to the amplitude adjusted combined information wave, hereby producing a filter biased wave.

7. Method claimed in claim 6 wherein the step of adjusting the amplitudes of the positive and negative segments comprises the steps of:
   a) multiplying the positive segment of the combined information wave by a factor which adjusts the amplitude of the positive segment to a pre-set amplitude; and
   b) multiplying the negative segment of the combined information wave by a factor which adjusts the amplitude of the negative segment to a pre-set amplitude which is equal to the pre-set amplitude of the positive segment.

8. An apparatus for reducing the distortion imposed on a combined information wave by a receiver filter or other signal processor, said combined information wave comprising a reference wave of a known wave form, frequency and amplitude, and one or more component information waves of known and distinct frequencies and known wave forms and phases, said apparatus comprising:
   a) an adder circuit for combining the component information waves and the reference wave to form the combined information wave;
   b) a wave shaper for multiplying each segment of the combined information wave by selected factors on a half cycle basis, thereby producing an equalized wave with positive and negatives segments of equal amplitudes;
   c) a wave multiplier for proportionally adjusting the amplitudes of the equalized positive and negative segments to produce an amplitude adjusted wave with pre-selected and equal positive and negative amplitudes.

9. Apparatus as claimed in claim 8 further comprising a wave train circuit for adding successive combined information waves together to form a continuous train of combined information waves.

10. An apparatus for reducing the distortion imposed upon a combined information wave by a filter system or other signal processor, said combined information wave comprising a reference wave and one or more component information waves of known and distinct frequencies, said reference wave having positive and negative segments of known amplitudes, said combined information wave having positive and negative segments, said apparatus comprising:
   a) means for equalizing the positive and negative segments of said combined information wave;
   b) means for adjusting the amplitude of the equalized information wave to produce an adjusted information wave having positive and negative segments with equal and pre-selected amplitudes;
   c) means for predicting a response of the filter or other signal processor to the equalized information wave; and
   d) means for biasing the equalized information wave prior to transmission to compensate for said predicted response.

11. Apparatus as claimed in claim 10 wherein the means for equalizing the positive and negative segments of said information wave and the means for adjusting the amplitude of the equalized information wave comprise:
   a) an adder circuit for combining the component information waves and the reference wave to form the combined information wave;
   b) a wave shaper for multiplying each segment of the combined information wave by selected factors on a half cycle basis, thereby producing an equalized wave with positive and negatives segments of equal amplitudes; and
   c) a wave multiplier for proportionally adjusting the amplitudes of the equalized positive and negative segments to produce an amplitude adjusted wave with pre-selected and equal positive and negative amplitudes.

12. Apparatus as claimed in claim 10 wherein the means for predicting a response of the filter or other signal processor to the information wave and the means for biasing the information wave prior to transmission to compensate for said predicted response comprise:
   a) a filter or other signal processor which is the same as the receiver filter or other signal processor;
   b) a wave subtracter for subtracting the information wave from a wave produced by passing the information wave through the filter or other signal processor, thereby producing the predicted response; and
   c) one or more circuits for phase shifting the predicted response by one-hundred eighty degrees and adding the phase shifted response to the information wave.

13. An apparatus for reducing the distortion imposed upon a combined information wave by a filter system or other signal processor, said combined information wave comprising a reference wave and one or more component information waves of known and distinct frequencies, said reference wave having positive and negative segments of known amplitudes, said combined information wave having positive and negative segments, said apparatus comprising:
   a) a reference circuit for generating a reference wave and combining the reference wave with the component information waves to form the combined information wave;
   b) an equalizer circuit for equalizing the amplitudes of the positive and negative segments of the combined information wave to produce an equalized wave; and
   c) a composite circuit for adjusting the amplitudes of the positive and negative segments of the equalized wave to produce an adjusted wave with positive and negative segments of equal and pre-selected amplitudes.

14. Apparatus as claimed in claim 13 further comprising a means for combining successive adjusted waves to form a continuous train of adjusted waves.

* * * * *

UNITED STATES PATENT AND TRADEMARK OFFICE
CERTIFICATE OF CORRECTION

PATENT NO. : 6,137,831
DATED : October 24, 2000
INVENTOR(S) : Neldon Johnson

It is certified that error appears in the above-identified patent and that said Letters Patent is hereby corrected as shown below:

Column 3,
Line 6, the SUMMARY OF THE INVENTION which reads:
"...be filtered out. The waves can then be separated using amplitude is very useful in certain applications especially those applications where passing the signal through conventional filters is required."

A complete page of the allowed application has been omitted and should be inserted as follows:

"-- ...be filtered out. The waves can then be separated using (insert full contents of page 11 of the amended SUMMARY OF THE INVENTION attached hereto and continue with page 12) ... amplitude is very useful in certain applications where passing the signal through conventional filters is required." --

Column 11,
Line 54, of the SUMMARY OF THE INVENTION which reads:
"... [B]its stored using the resent invention would appropriate no ..." (emphasis added)
The typographical error should be corrected as follows:
-- ... [B]its stored using the [resent] present invention would appropriate no..." --

Signed and Sealed this

Sixteenth Day of April, 2002

*Attest:*

JAMES E. ROGAN
*Attesting Officer*   *Director of the United States Patent and Trademark Office*